(12) United States Patent
Caloz et al.

(10) Patent No.: US 9,496,914 B2
(45) Date of Patent: Nov. 15, 2016

(54) POLARIZATION-DIVERSE ANTENNAS AND SYSTEMS

(75) Inventors: Christophe Caloz, Montreal (CA);
Samer Abielmona, Ottawa (CA);
(Continued)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 611 days.

(21) Appl. No.: 13/979,143

(22) PCT Filed: Jan. 13, 2012

(86) PCT No.: PCT/CA2012/000034
§ 371 (c)(1),
(2), (4) Date: Nov. 15, 2013

(87) PCT Pub. No.: WO2012/094747
PCT Pub. Date: Jul. 19, 2012

(65) Prior Publication Data
US 2014/0347234 A1    Nov. 27, 2014

Related U.S. Application Data

(60) Provisional application No. 61/432,320, filed on Jan. 13, 2011, provisional application No. 61/567,505, filed on Dec. 6, 2011.

(51) Int. Cl.
*H04B 1/58* (2006.01)
*H01Q 15/22* (2006.01)
(Continued)

(52) U.S. Cl.
CPC ............ *H04B 1/58* (2013.01); *H01P 5/222* (2013.01); *H01Q 1/38* (2013.01); *H01Q 1/50* (2013.01);
(Continued)

(58) Field of Classification Search
CPC .............. H01Q 13/203; H01Q 13/20; H01Q 15/0086; H01Q 1/38; H01Q 15/24;
(Continued)

(56) References Cited

U.S. PATENT DOCUMENTS

2009/0289737 A1* 11/2009 Itoh .................. H01P 5/222
333/120

FOREIGN PATENT DOCUMENTS

WO     2011/069253 A1    6/2011

OTHER PUBLICATIONS

Hashemi et al, "Dual-Mode Leaky-Wave Excitation in Symmetric Composite Right/left-Handed Structure with Center Vias" May 23, 2010, Microwave Symposium Digesat (MTT), 2010 IEEE MTT-S International, pp. 9-12.
(Continued)

*Primary Examiner* — Benny Lee
*Assistant Examiner* — Jorge Salazar, Jr.

(57) ABSTRACT

Antenna units, antenna systems and polarizing systems provide polarization diversity to leaky-wave antennas. An antenna unit comprises a rat-race coupler having a summation port, a difference port and two output ports. Each one of a pair of composite right/left-handed (CRLH) leaky-wave antennas (LWA) is connected at one end to a respective one of the output ports of the rat-race coupler. An inductive stub is implemented between the CRLH LWAs for connecting the CRLH LWAs to a grounded via. Various polarizations are obtained by injecting a radio-frequency (RF) signal in the summation or difference port of the rat-race coupler, or in both ports. System variants include various devices and assemblies for injecting RF signals in the antenna unit. One such variant includes a polarizing system having a switched matrix for directing a signal according to various intended polarizations.

14 Claims, 23 Drawing Sheets

(75) Inventors: Van-Hoang Nguyen, Montréal (CA);
Ning Yang, Calgary (CA)

(51) Int. Cl.
*H01Q 1/38* (2006.01)
*H01Q 15/24* (2006.01)
*H01Q 13/20* (2006.01)
*H01Q 1/50* (2006.01)
*H01Q 21/24* (2006.01)
*H01P 5/22* (2006.01)
*H01Q 15/00* (2006.01)

(52) U.S. Cl.
CPC ............ *H01Q 13/20* (2013.01); *H01Q 13/206* (2013.01); *H01Q 15/24* (2013.01); *H01Q 21/24* (2013.01); *H01Q 15/0086* (2013.01)

(58) Field of Classification Search
CPC .................... H01Q 13/206; H01Q 1/50; H01Q 21/24; H04B 5/0018; H04B 1/58; H01P 5/222

USPC ..... 333/120, 237, 21 A, 21 R; 343/756, 777, 343/700 MS
See application file for complete search history.

(56) References Cited

OTHER PUBLICATIONS

Hashemi et al.,"Evolution of Composite Right/left-Handed Leaky-Wave Antennas" Oct. 2011, Proceeding of the IEEE, vol. 99, No. 10, pp. 1746-1754.

Hashemi et al.,"Coupled Composite Right/Left-Handed Leaky-Wave Transmission Line based on Common/Differential-Mode Analysis" Dec. 2010 IEEE Transactions on Microwave Theory and Techniques, vol. 58, No. 12, Dec. 2010.

\* cited by examiner

PRIOR ART

PRIOR ART

PRIOR ART

PRIOR ART

POLARIZATION-DIVERSE ANTENNAS AND SYSTEMS

TECHNICAL FIELD

The present disclosure relates to a leaky-wave antenna capable of providing polarization diversity (horizontal, vertical, and circular).

BACKGROUND

Wireless devices are equipped with antennas which radiate a signal having a physical orientation called polarization. Polarization can be horizontal, vertical, or circular, depending on the antenna's orientation. When travelling across unobstructed environments, the signal maintains its polarization and reaches the receiving antenna unchanged. If the receiving antenna exhibits the same polarization as the incoming signal, then a high signal power is obtained at the receiver and a good data rate ensues. In indoor and urban environments however, the random presence of numerous reflective and diffractive objects leads to a change in the signal's polarization (from horizontal to vertical or from vertical to horizontal). If the receiving antenna is not oriented in the same manner as the incoming signal's unknown polarization, then a lower signal power is obtained. An antenna which is capable of simultaneously receiving both horizontal and vertical polarizations or is able to switch between polarizations is ideally suited for highly reflective indoor environments.

To combat reflective and diffractive effects, one approach is to use circularly-polarized (CP) antennas. First, CP antennas reduce polarization losses because the signal is transmitted and/or received in all planes. Secondly, due to its radial rotation, a CP signal better propagates through obstructions, such as walls (e.g. reinforced concrete with vertical metallic stubs), than linearly-polarized signals, which increases the range and coverage area. Thirdly, CP antennas alleviate the effects of multi-paths, reducing small-scale fading.

Early work on serially-fed CP arrays involved waveguide and planar implementations. In a publication by K. Sakakibara et al., published in *IEEE Trans. Vehic. Techn.*, vol. 48, no. 1, pp. 1-7, in January 1999, a pair of orthogonal slots are etched on the top surface of a waveguide, with each pair being separated by a quarter-guided wavelength $\lambda\_g/4$ to achieve CP. However, this array cannot scan the full-space, and only one CP (right or left) is obtained when the signal is injected from either end.

The composite right/left-handed (CRLH) leaky-wave antenna (LWA) is considered as a serially-fed array. It is advantageous over corporate-fed arrays due to the absence of a complex feeding network, making it more compact, less lossy and less costly, as reported in a publication by L. Lui et al., published in *Electron. Lett.*, vol. 38, no. 23, pp. 1414-1416, in November 2002.

In a publication by M. Hashemi and T. Itoh, published in *IEEE Intern. Conf. Wirel. Infor. Techn. and Systems*, Honolulu, Hi., on Aug. 28, 2010, a hybrid coupler is connected to two orthogonal CRLH LWAs to achieve CP. The antennas can scan the full-space with both polarizations obtained from a single end. However, this configuration greatly increases the structure's form factor and is not conducive to array implementations. Also, in a publication by Y. Dong and T. Itoh, published in *Proc. of APMC*, Yokohama, Japan, on Dec. 7-10, 2010, a hybrid coupler is connected to two co-planar substrate-integrated CRLH LWAs each having oppositely slanted slots for CP. This antenna can also scan the full-space, and provide both polarizations from a single end. However, it is not adaptable for single-frequency electronic-scanning.

The CRLH LWA has been receiving increased attention due to its many advantages, as explained by L. Liu, C. Caloz, and T. Itoh in a publication entitled "*Dominant mode (DM) leaky-wave antenna with backfire-to-endfire scanning capability*", published in *Electron. Letters*, vol. 38, no. 23, pp. 1414-1416, on November 2002. Fundamentally, the CRLH LWA is a beam-scanning antenna similar to phased arrays, however without the bulky and lossy feeding network and without the lossy and costly phase shifters. This ideally allows CRLH LWAs to be used in various beam-steering communication applications such as radars, satellite communications, and Wireless Fidelity (WiFi).

CRLH LWAs have undergone many improvements since their discovery, as reported in a publication from M. Hashemi and T. Itoh, entitled "*Evolution of composite right/left-handed leaky-wave antennas*," published in *Proc. of the IEEE*, vol. 99, no. 10, pp. 1746-1754, in October 2011. One such improvement includes a recently proposed CRLH which exhibits dual-polarization, described in a publication from M. R. M. Hashemi and T. Itoh, entitled "*Dual-mode leaky-wave excitation in symmetric composite right/left-handed structure with center vias*", published in *Proceedings. Institute of Electrical and Electronics Engineer (IEEE) MTT-S Int. Microwave Symposium*, Anaheim, Calif., in May 2010, pp. 9-12, hereinafter "*Hashemi* 2010", from which FIG. 1 shows a dual-polarized CRLH LWA. The CRLH LWA 1 of *Hashemi* 2010 is composed of two symmetric CRLH LWAs 2 and 3 sharing a common via 6, with each CRLH LWA being composed of series inter-digital capacitors 5 and shunt stub inductors 4. By exciting the structure at V1 and V2 with a common-mode (CM) signal and a differential-mode (DM) signal, the CRLH LWA radiates in horizontal-polarization (along x) and in vertical-polarization signal (along y), respectively. However, this dual-polarization CRLH LWA suffers from a major drawback which is the unbalanced behavior of the common and differential modes. This unbalanced behavior leads to undesired effects. Under separate common-mode and differential-mode excitations, the dual-polarized CRLH LWA's unit cell (UC) can be modeled using two different electrical circuits.

FIG. 2 shows the circuit diagram for the dual-polarized CRLH LWA of *Hashemi* 2010 using a shared via. More specifically, FIG. 2 provides a close-up of the dual-polarized CRLH LWA's unit cell 7. Under separate CM and DM excitations, the UC 7 can be modeled using two different electrical circuits. As shown in a lower part of FIG. 2, the common-mode and differential-mode circuit diagrams are similar except that two inductors, which model the shared via 6 with a value of $L_{via}/2$, are missing from the differential mode circuit diagram. This is due to the differential excitation inducing a virtual short circuit in the middle of the structure which shorts out the via 6.

FIG. 3 shows the modal reflection ($S_{11}$) and transmission ($S_{21}$) responses for common-mode ($S^{cc}$) and differential-mode ($S^{dd}$) excitations for the dual-polarized CRLH LWA of *Hashemi* 2010 using a shared via. In the Figure, $S_{11}$ refers to a reflection coefficient (from a port 1 back to the same port 1) while $S_{21}$ refers to a transmission coefficient (from a port 1 to another port 2). FIG. 4 shows the modal transmission ($S_{21}$) phase response for common-mode ($S^{cc}$) and differential-mode ($S^{dd}$) excitations for the dual-polarized CRLH LWA of *Hashemi* 2010 using a shared via. The effect of having two different circuit behaviors under common-mode and differential-mode excitations is shown in FIGS. 3 and 4, where the modal (common and differential) scattering parameters' amplitude and phase responses are shown, respectively. As can be seen, the common-mode and differential-mode S-parameters ($S^{cc}$ and $S^{dd}$) are dissimilar in both magnitude and phase. Ultimately, as a result of the different modal responses, the dual-polarized CRLH LWA radiates two different beams (in shape and pointing angle) under common-mode excitation (for horizontal polarization) and differential-mode excitation (for vertical polarization), thus making the proposed dual-polarized CRLH LWA of Hashemi 2010 impractical.

There is therefore a need for a polarization-diverse CRLH LWA and for an antenna system employing the polarization-diverse CRLH LWA.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

In wireless applications, and especially mobile wireless applications, it is desirable to use directional beams. It is a further benefit for the reasons disclosed above that an antenna in the wireless device maintains a desired polarization. A desirable capability is therefore provided by an antenna system that can provide a directional beam with a desired polarization for use in a wireless device. Examples of a mobile wireless device incorporating such an antenna system could include a laptop computer or tablet computer or smartphone communicating with an access point over a wireless fidelity (WiFi) network, or communicating with a base-station over a cellular wireless network.

Another high scattering application of a leakywave antenna with polarization diversity would include radio frequency identification systems.

Figure 1:
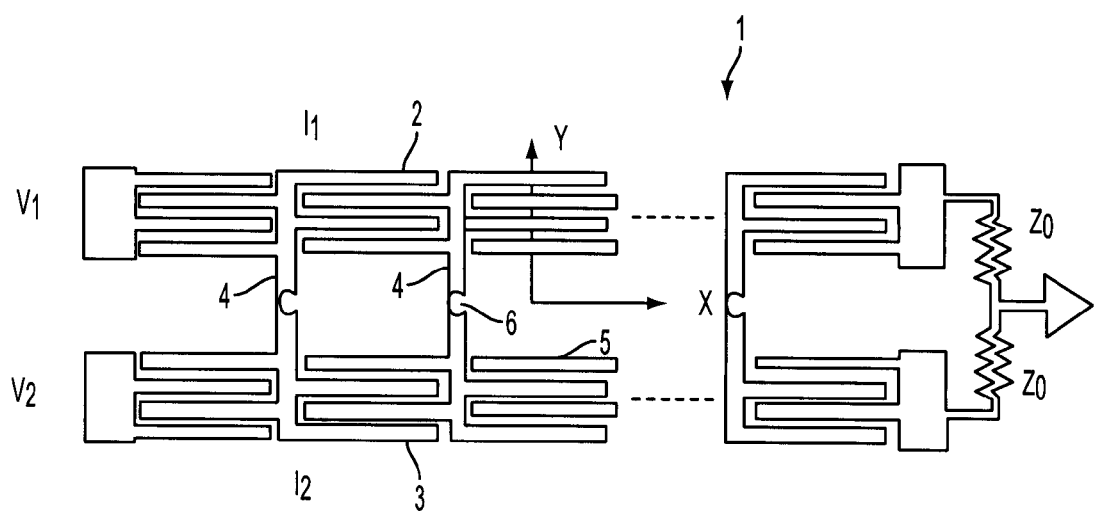
FIG. 1 (prior art) shows a dual-polarized CRLH LWA.
Figure 2:
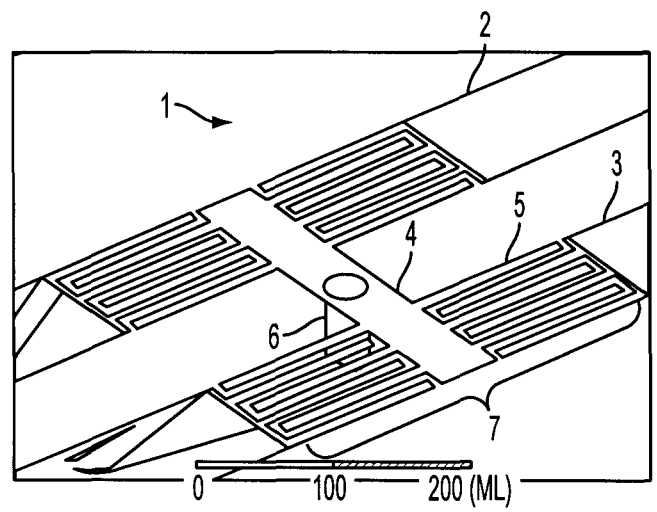
FIG. 2 (prior art) shows the circuit diagram for the dual-polarized CRLH LWA of Hashemi 2010 using a shared via.
Figure 2:
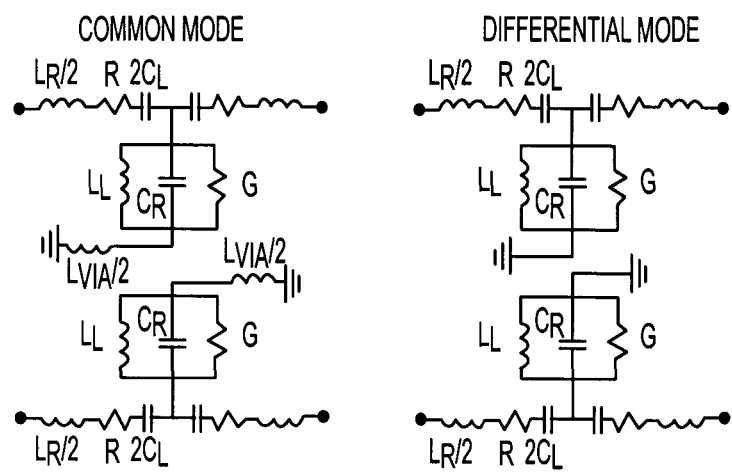
Figure 3:
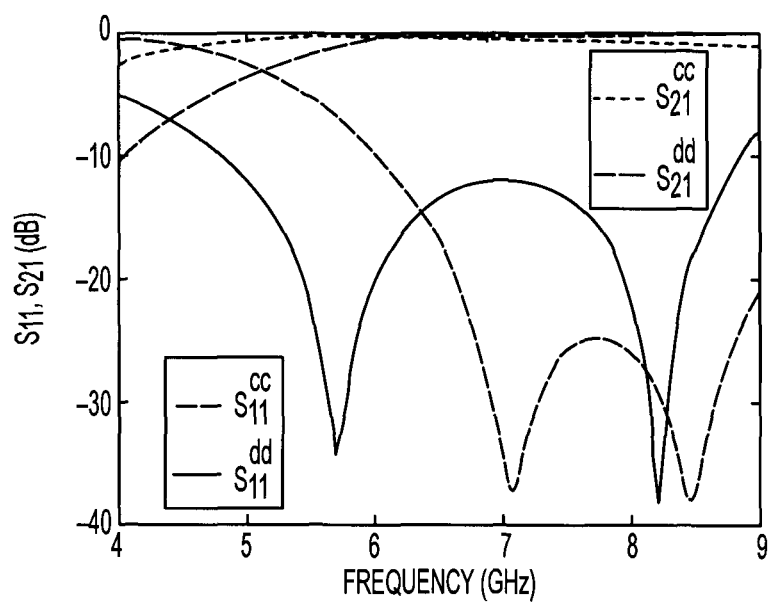
FIG. 3 (prior art) shows the modal reflection ($S_{11}$) and transmission ($S_{21}$) responses for common-mode ($S^{cc}$) and differential-mode ($S^{dd}$) excitations for the dual-polarized CRLH LWA of Hashemi 2010 using a shared via.
Figure 4:
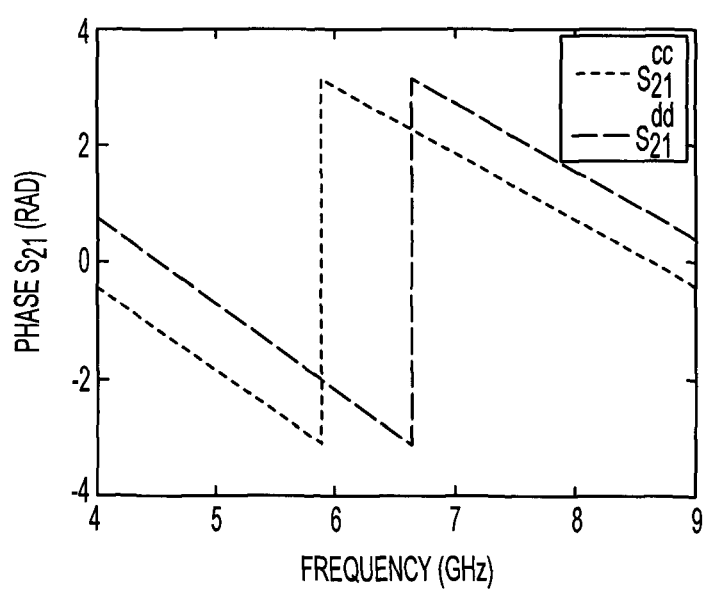
FIG. 4 (prior art) shows the modal transmission ($S_{21}$) phase response for common-mode ($S^{cc}$) and differential-mode ($S^{dd}$) excitations for the dual-polarized CRLH LWA of Hashemi 2010 using a shared via.
Figure 5:
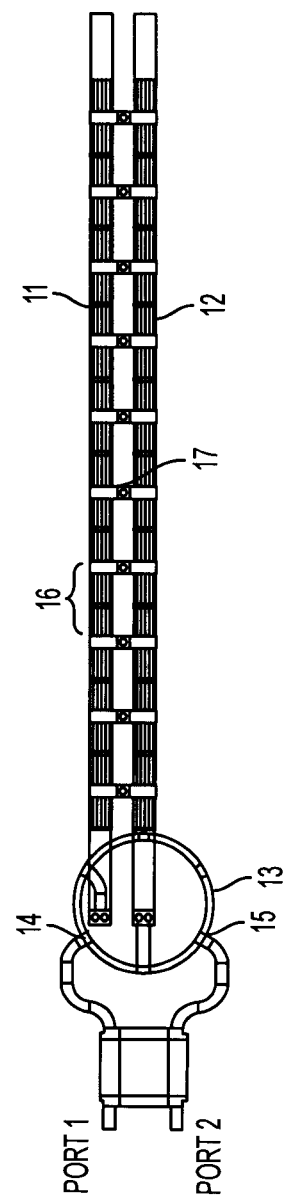
FIG. 5 is a schematic representation of two co-planar CRLH LWAs sharing a single grounded via in the middle of each inductive stub, according to an embodiment.

The present disclosure provides a circularly-polarized (CP) composite right/left-handed (CRLH) leaky-wave antenna (LWA). Various embodiments of a CP CRLH LWA presented here overcome several of the above-mentioned disadvantages. Referring now to the drawings, FIG. 5 is a schematic representation of two co-planar CRLH LWAs sharing a single grounded via in the middle of each inductive stub, according to an embodiment. In the shown LWA unit, two CRLH LWAs 11 and 12 are connected to both output ports of a rat-race coupler 13. A signal injected in the rat-race's summation port (not specifically shown) leads to both CRLH LWAs 11 and 12 having in-phase longitudinal currents along the inter-digital capacitors 16 implemented along the two CRLH LWAs 11 and 12 and out-of-phase transversal currents in the stubs 17. A signal injected in the rat-race's difference port (not specifically shown) leads to both CRLH LWAs 11 and 12 having out-of-phase longitudinal currents along the inter-digital capacitors and in-phase transversal currents along the stubs.

In this manner, two orthogonal components are simultaneously obtained. By connecting the rat-race's summation and difference ports to a hybrid coupler, time-quadrature between the two orthogonal components is obtained to achieve CP.

Figure 6:
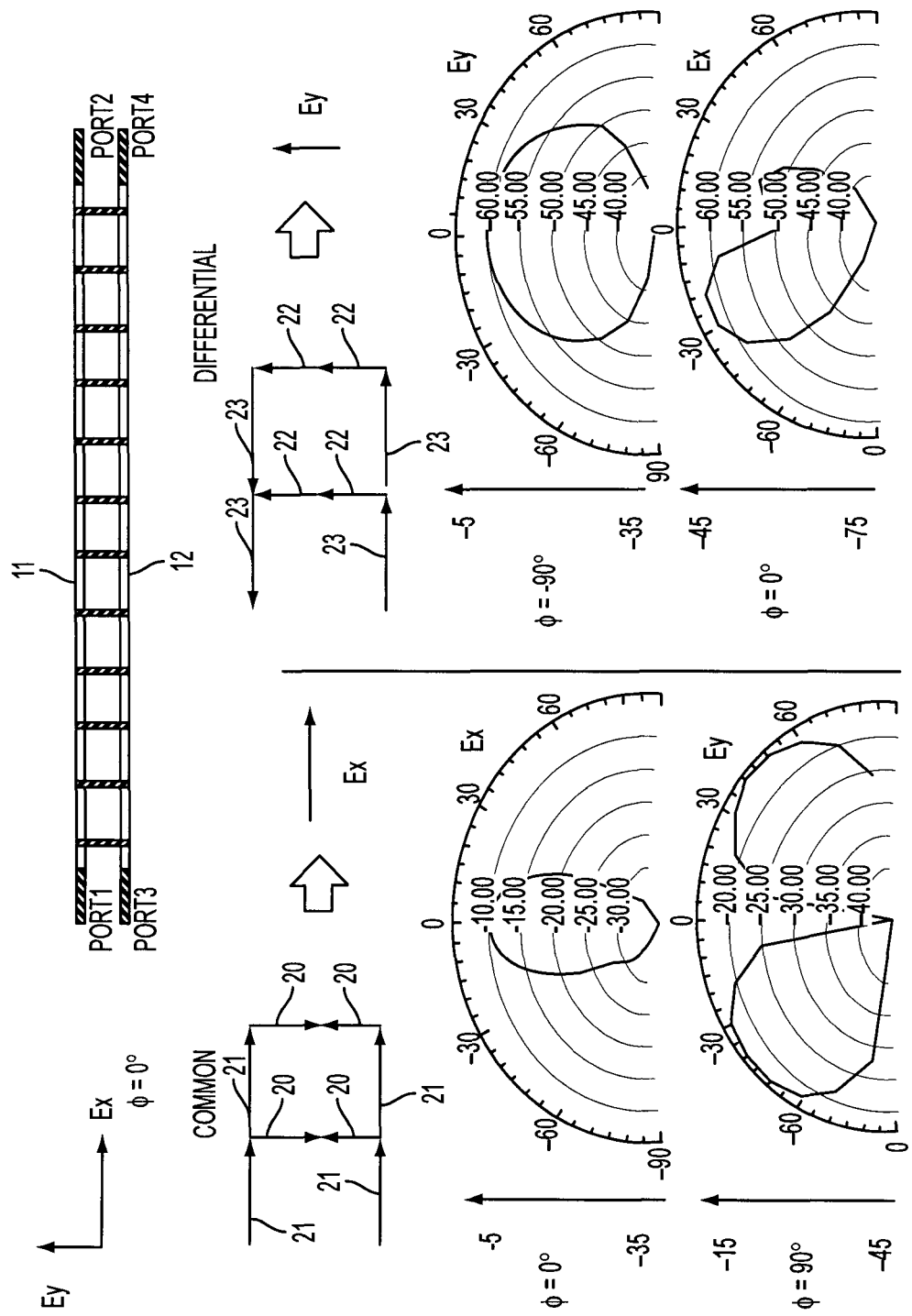
FIG. 6 illustrates the CP CRLH LWA of FIG. 5, excited at port 1 and 3 and terminated at port 2 and 4.

FIG. 6 illustrates the CP CRLH LWA of FIG. 5, excited at port 1 and 3 and terminated at port 2 and 4. In the common mode, the currents 20 in the stubs are in opposite direction and therefore will cancel out in the far-field while the currents 21 in the inter-digital capacitor will add constructively and result in a horizontal field Ex. The bottom left graphs show the simulated results (using "Method of Moments Ansoft Designer" from ANSYS of Canonsburg, Pa., USA) of Ex and Ey for a common mode excitation with a broadside operation at 2.7 GHz. At broadside (theta=0°), the far-field is primary Ex (−10 dB). In the differential mode, the currents 23 in the inter-digital capacitors are in opposite direction and will destructively interfere in the far-field. On the other hand, the current 22 in the stubs are now in same direction and will add constructively and result in a vertical field Ey. The bottom right graphs show the simulated results of Ex and Ey for a differential mode excitation at 2.7 GHz. In this configuration, the primary far-field is Ey (−10 dB).

Although the CP CRLH LWA of FIG. 5 radiates two different beams under common-mode and differential-mode excitations, the solutions outlined next address this problem and are applicable to the CP CRLH LWA. The present disclosure therefore additionally introduces two new features for polarization-diverse CRLH LWA. Firstly, three new solutions are described which solve the unbalanced response under common-mode (CM) and differential-mode (DM) excitations seen in current state-of-the-art polarization-diverse CRLH LWAs. This effectively renders the new polarization-diverse CRLH LWAs usable in commercial products. Secondly, several new antenna systems are proposed employing the new polarization-diverse CRLH LWAs.

Three solutions based on enhanced dual-polarized CRLH LWA with similar radiation beams under common-mode and differential-mode excitations are outlined hereinbelow, to solve the unbalanced response under CM and DM excitations. The goal of all three solutions is to ensure that the unit cells (UC) exhibit the same circuit response under both excitations.

Figure 7:
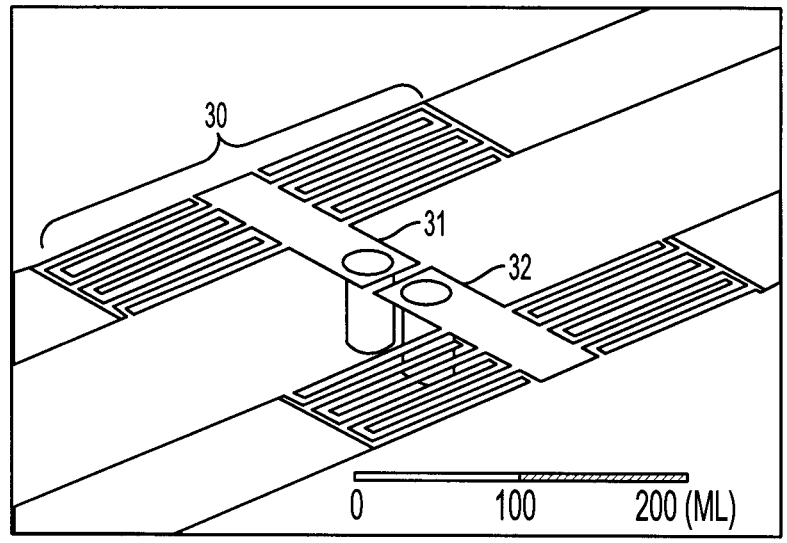
FIG. 7 shows the circuit diagram for a dual-polarized CRLH LWA using a split-via implementation according to another embodiment.
Figure 7:
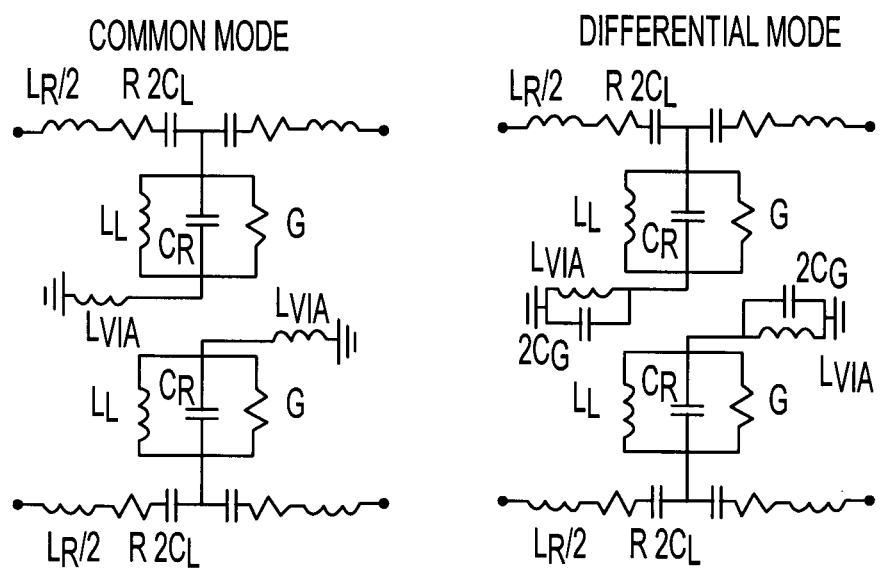
Figure 8:
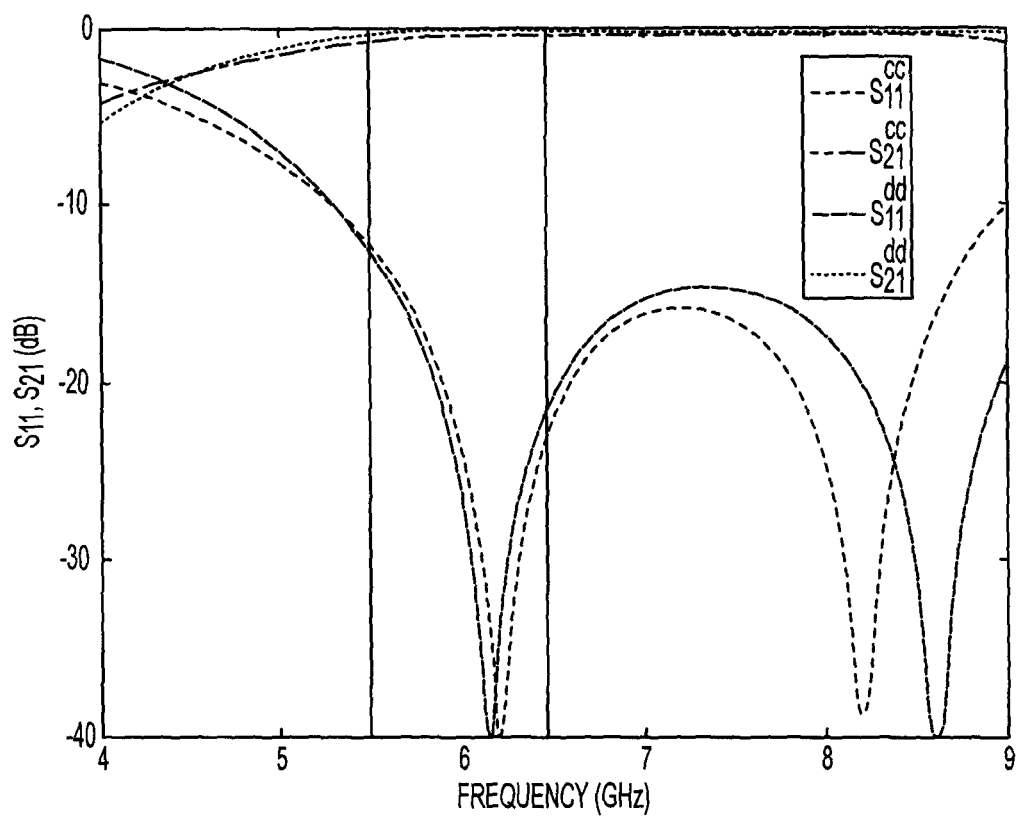
FIG. 8 shows the modal reflection and transmission amplitude response for common-mode ($S^{cc}$) and differential-mode ($S^{dd}$) excitations for the dual-polarized CRLH LWA of FIG. 7.
Figure 9:
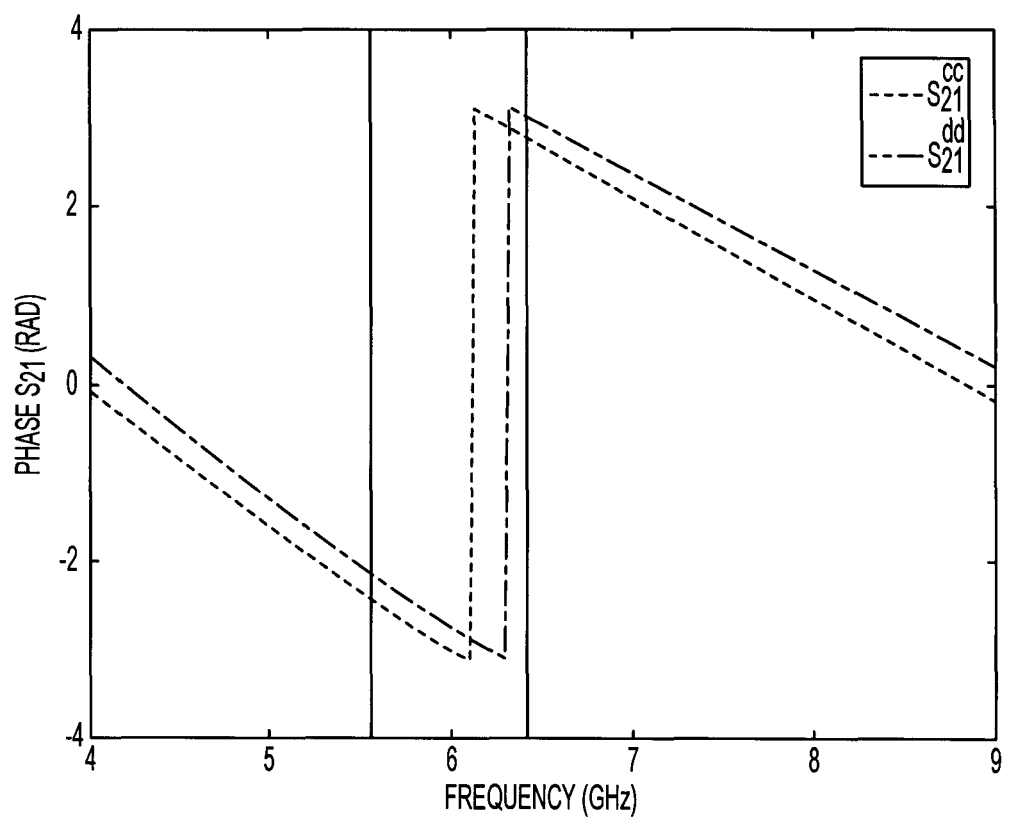
FIG. 9 shows the modal transmission phase response for common-mode ($S^{cc}$) and differential-mode ($S^{dd}$) excitations for the dual-polarized CRLH LWA of FIG. 7.

The first proposed solution is shown in FIG. 7, which shows the circuit diagram for a dual-polarized CRLH LWA using a split-via implementation according to another embodiment. In FIG. 7, the shared via of the LWA unit is split into two separate vias 31 and 32. The circuit diagram of the UC 30 under CM and DM excitations are also shown in FIG. 7. As may be seen, the circuits are similar except for two extra capacitors, each having a value of 2 $C_g$ under DM excitation, which model the gap capacitance between the shunt stubs. The value of the gap capacitances is extremely small, in the order of femto-farads, essentially rendering them transparent to the circuit, and hence making the CM and DM circuits similar. FIG. 8 shows the modal reflection and transmission amplitude response for common-mode ($S^{cc}$) and differential-mode ($S^{dd}$) excitations for the dual-polarized CRLH LWA of FIG. 7. FIG. 9 shows the modal transmission phase response for common-mode ($S^{cc}$) and differential-mode ($S^{dd}$) excitations for the dual-polarized CRLH LWA of FIG. 7. FIGS. 8 and 9 thus show the amplitude and phase of the modal scattering parameters, respectively. As may be seen, the common-mode ($S^{cc}$) and differential-mode ($S^{dd}$) responses are similar, indicating that the UC behaves in the same manner under both types of excitations, and hence the dual-polarized CRLH LWA radiates two similar beams in shape and pointing angle.

Figure 10:
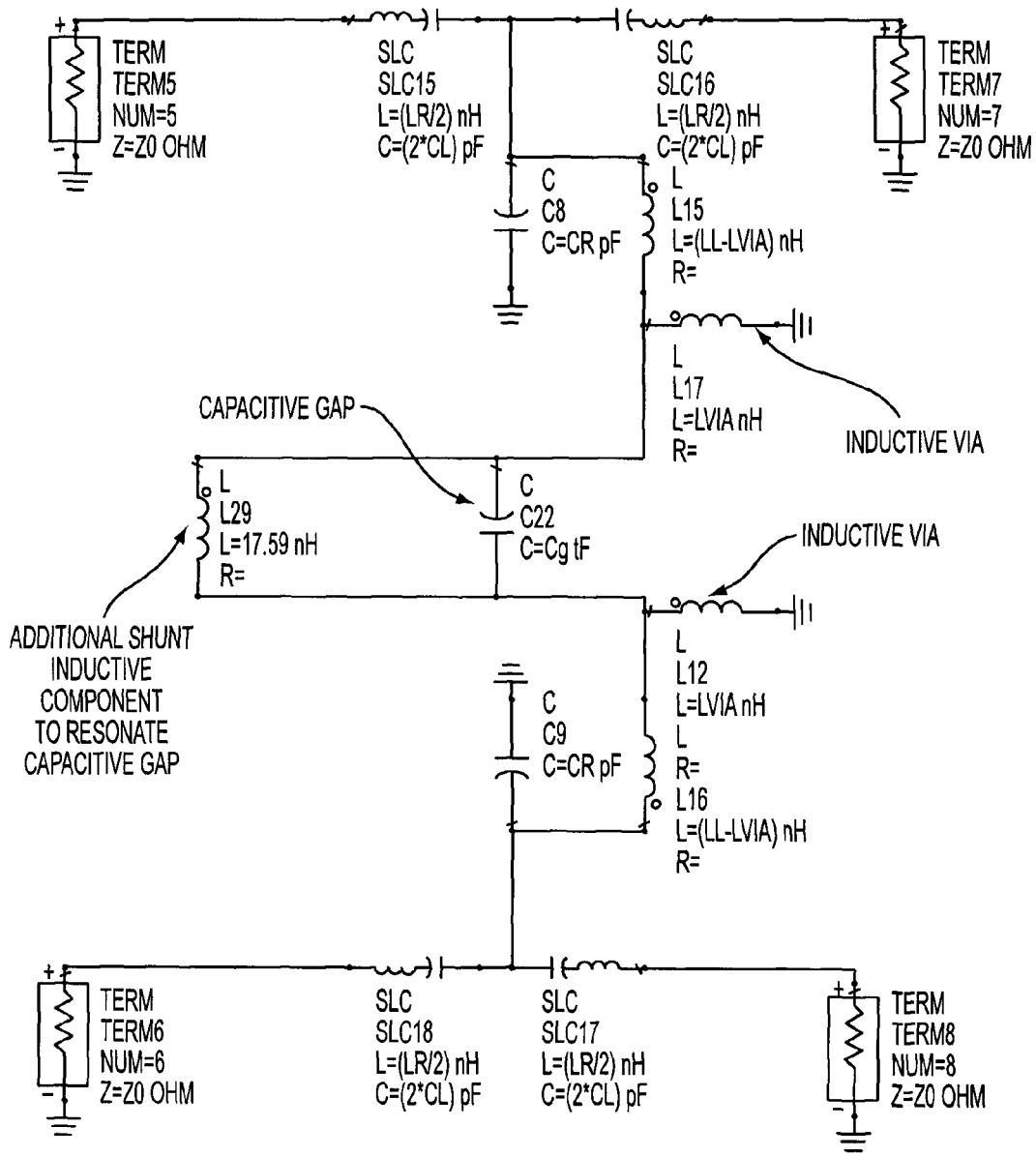
FIG. 10 shows the circuit diagram for a dual-polarized CRLH LWA using a split-via with inductor implementation according to a further embodiment.
Figure 11:
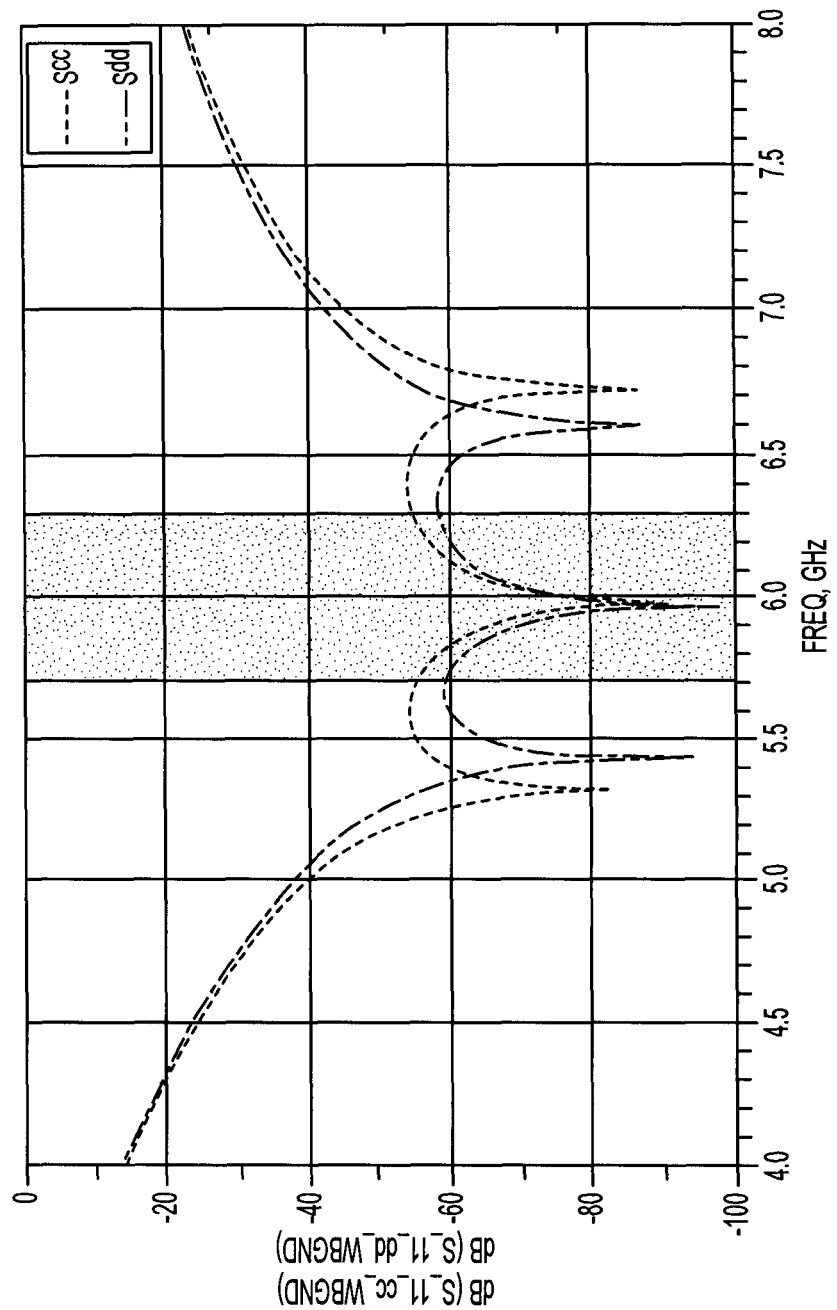
FIG. 11 shows the modal reflection amplitude response for common-mode ($S^{cc}$) and differential-mode ($S^{dd}$) excitations for the dual-polarized CRLH LWA of FIG. 10.
Figure 12:
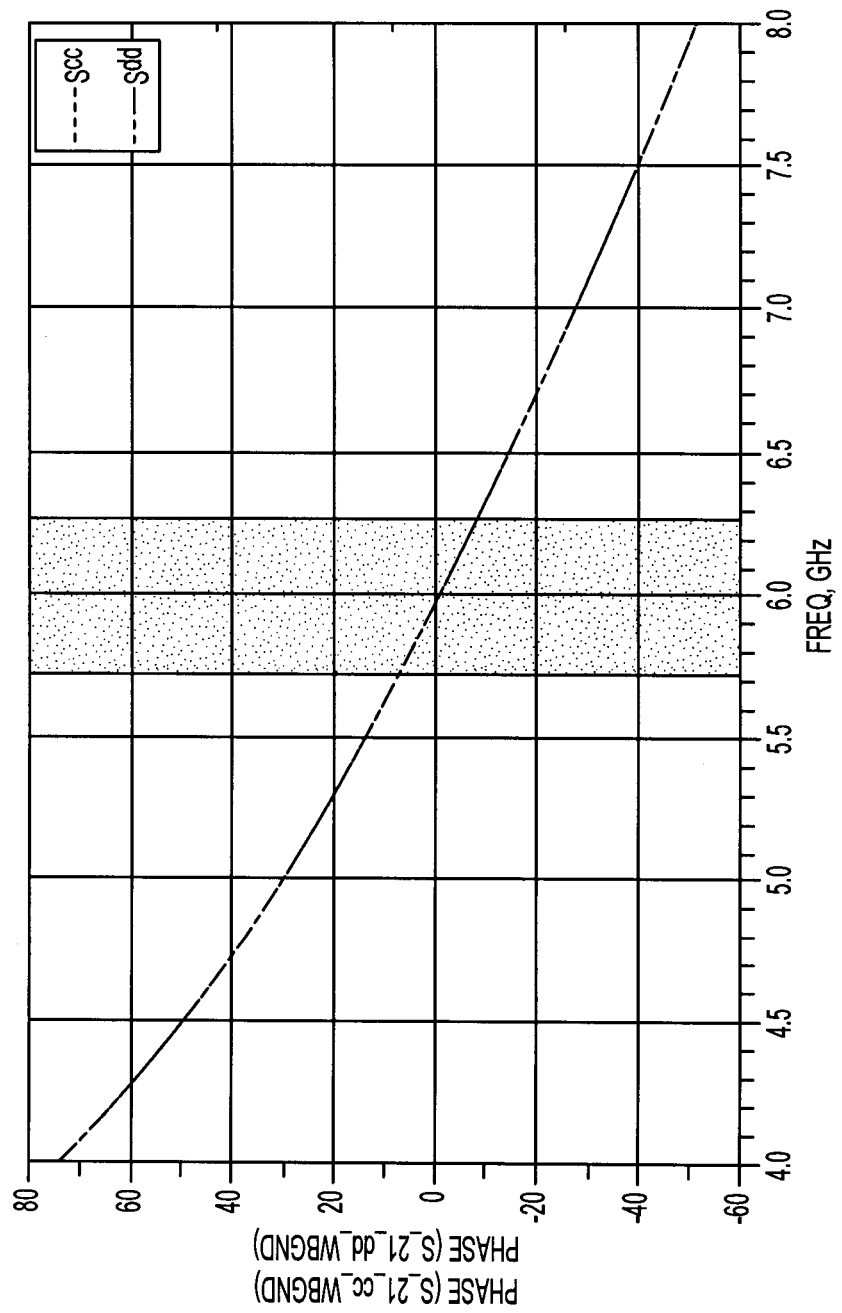
FIG. 12 shows the modal transmission phase response for common-mode ($S^{cc}$) and differential-mode ($S^{dd}$) excitations for the dual-polarized CRLH LWA of FIG. 10.

The second proposed solution is shown in FIG. 10, which shows the circuit diagram for a dual-polarized CRLH LWA using a split-via with inductor implementation according to a further embodiment. In FIG. 10, the split-via implementation of the LWA unit, as shown hereinabove, is adopted along with an additional inductive component 40 connected across the gap between the shunt stubs. The inductive component 40, also called inductor, may be implemented in many ways (chip, bondwire, meandered line, etc. . . . ). The purpose of the inductive component 40 is to short out the gap capacitance 41, which makes the UC's circuit response equivalent under both common-mode and differential-mode excitations. This is seen in FIG. 11, which shows the modal reflection amplitude response for common-mode ($S^{cc}$) and differential-mode ($S^{dd}$) excitations for the dual-polarized CRLH LWA of FIG. 10, and in FIG. 12, which shows the modal transmission phase response for common-mode ($S^{cc}$) and differential-mode ($S^{dd}$) excitations for the dual-polarized CRLH LWA of FIG. 10. FIGS. 11 and 12 respectively illustrate the amplitude and phase responses of the modal scattering parameters, respectively. In FIG. 11, the $S_{11}$ amplitudes of the common-mode and differential-mode are similar, while in FIG. 12 the $S_{21}$ phases of the common-mode and differential-mode are also similar indicating that the UC behaves equivalently under both excitation modes.

Figure 13:
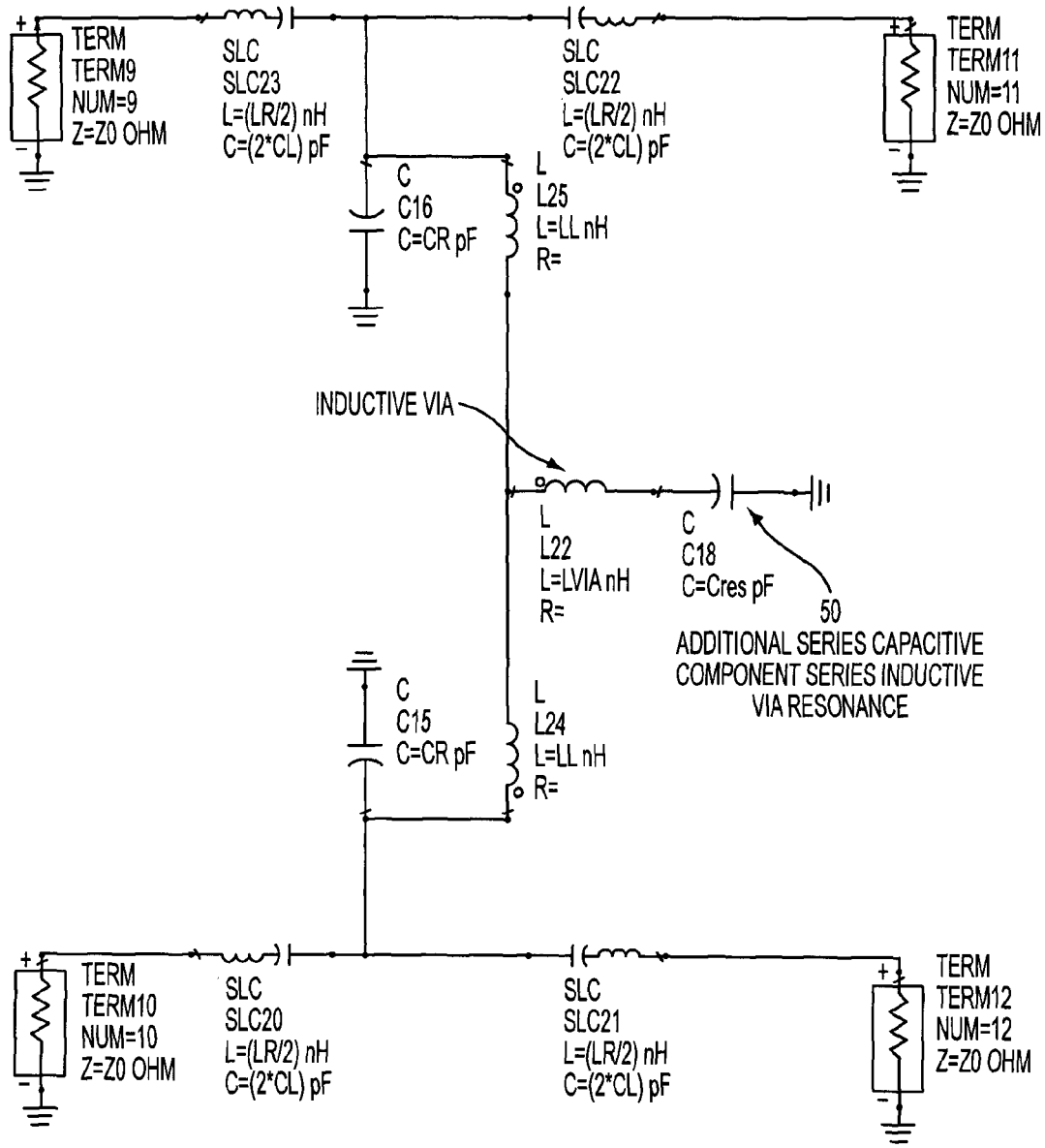
FIG. 13 shows the circuit diagram for a dual-polarized CRLH LWA using a shared-via with capacitor implementation according to yet another embodiment.
Figure 14:
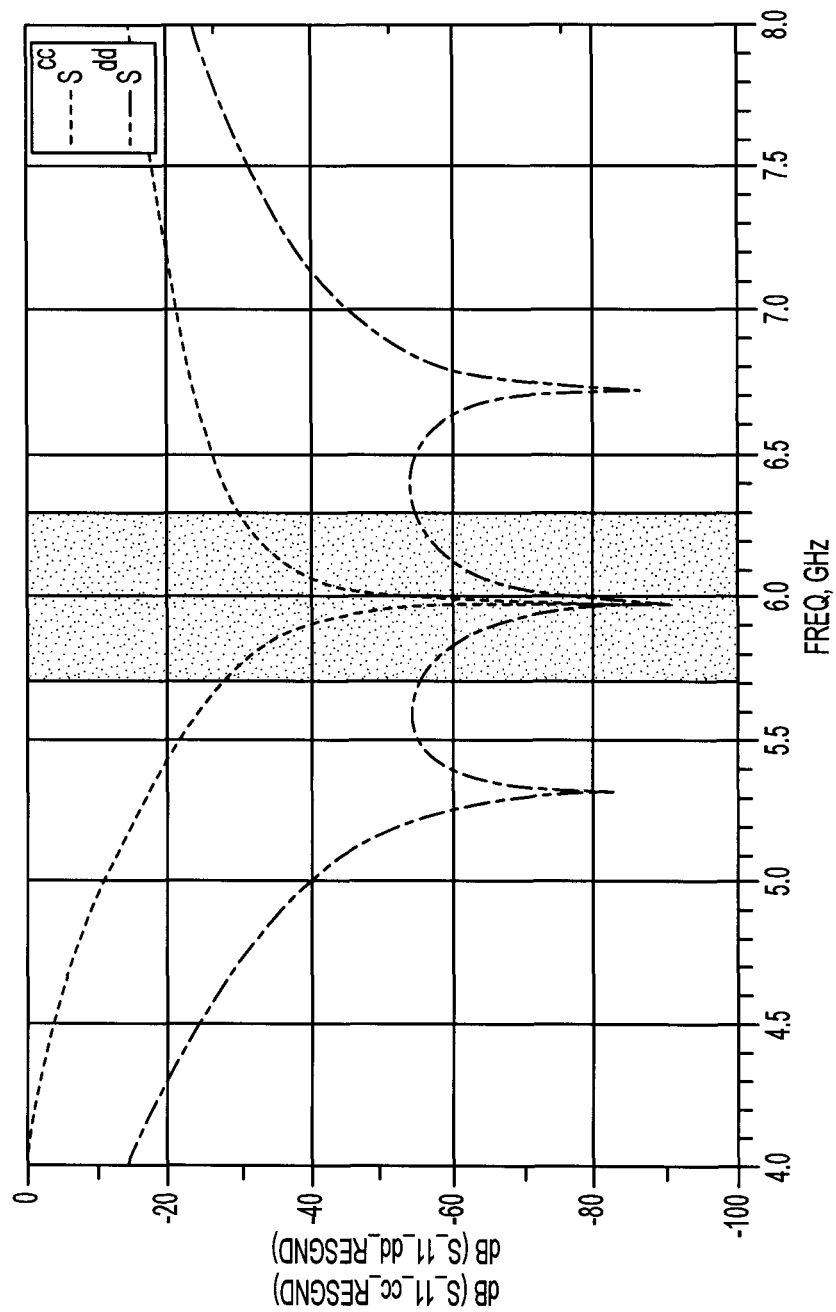
FIG. 14 shows the modal reflection amplitude response for common-mode ($S^{cc}$) and differential-mode ($S^{dd}$) excitations for the dual-polarized CRLH LWA of FIG. 13.
Figure 15:
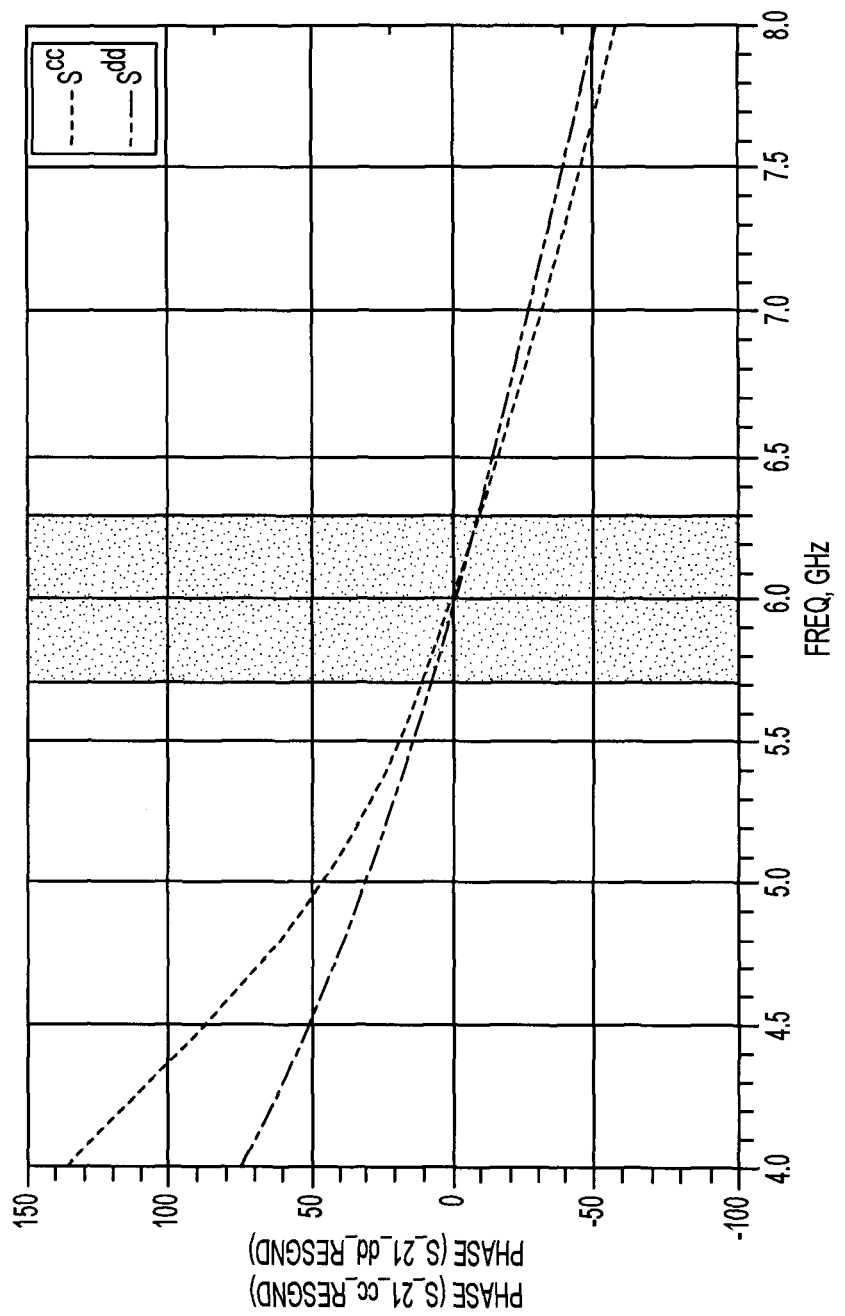
FIG. 15 shows the modal transmission phase response for common-mode ($S^{cc}$) and differential-mode ($S^{dd}$) excitations for the dual-polarized CRLH LWA of FIG. 13.

The third proposed solution is shown in FIG. 13, which shows the circuit diagram for a dual-polarized CRLH LWA using a shared-via with capacitor implementation according to yet another embodiment. In FIG. 13, the shared-via implementation of the LWA unit, as shown hereinabove, is adopted along with an additional capacitive component 50, or capacitor, connected in series with the shared-via. The capacitive component 50 may be implemented in many ways (chip, gap, etc . . . ). The purpose of the capacitive component 50 is to short out the shared-via, which makes the UC's circuit response equivalent under both CM and DM excitations. This is seen in FIG. 14, which shows the modal reflection amplitude response for common-mode ($S^{cc}$) and differential-mode ($S^{dd}$) excitations for the dual-polarized CRLH LWA of FIG. 13, and in FIG. 15, which shows the modal transmission phase response for common-mode ($S^{cc}$) and differential-mode ($S^{dd}$) excitations for the dual-polarized CRLH LWA of FIG. 13. FIGS. 14 and 15 respectively illustrate the amplitude and phase responses of the modal scattering parameters, respectively. In FIG. 14, the amplitudes of the CM's and DM's $S_{11}$ are similar, while in FIG. 15 the phases of the CM's and DM's $S_{21}$ are also similar indicating that the UC behaves equivalently under both excitation modes.

Those of ordinary skill in the art having the benefit of the present disclosure will be able to readily envision various other derivative implementations such as wide-bandwidth, frequency, polarization, and impedance tunability.

Those of ordinary skill in the art having the benefit of the present disclosure will also be able to readily envision various other derivative implementations such as an array configuration to increase gain and directivity in one embodiment, and an array configuration to provide two-dimensional scanning in another embodiment. They will also be able to readily envision the systems disclosed here as being applicable to single input single output (SISO), single input multiple output (SIMO), multiple input single output (MISO), and multiple input multiple output (MIMO) systems.

Figure 16A:
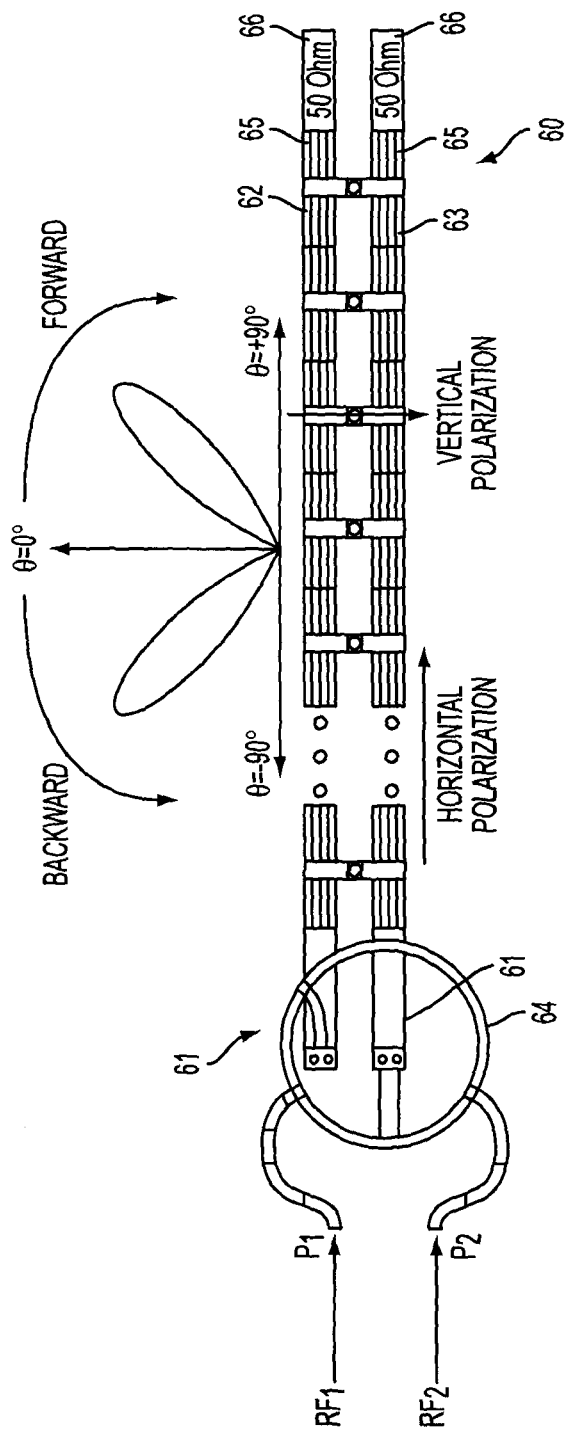
FIG. 16a shows an example of an antenna system fed at one of its ends, capable of generating full-space scanning beams ($-90° \le \theta \le +90°$) with single or dual polarizations.

Various new antenna systems are described next, each being based on either one of the three new dual-polarized CRLH LWA implementations proposed above. For instance, FIG. 16a shows an example of an antenna system fed at one of its ends, capable of generating full-space scanning beams (−90°≤θ≤+90°) with single or dual polarizations. More specifically, FIG. 16a illustrates a first antenna system 60 fed at one of its ends 61. The antenna system 60 is capable of generating up two full-space scanning beams (−90°≤θ≤+90°) with dual polarizations. The two-port dual-polarized CRLH LWA system 60 is composed of CRLH LWAs 62 and 63, with one end 61 connected to a rat-race circuit 64 and the other end terminated 65 with 500 electrical loads 66. If a radio-frequency (RF) signal ($RF_1$) is fed at P1 then a single beam is generated with horizontal polarization. If the RF signal ($RF_2$) is fed at P2, then a single beam is generated with vertical polarization. If the RF signal is fed at P1 and P2 simultaneously, then dual beams are generated with dual-polarization (horizontal and vertical).

The modulated data at $RF_{P1}$ and $RF_{P2}$ may be the same for diversity systems (SISO/SIMO/MISO), or may be different for multiplexing MIMO systems.

Figure 16B:
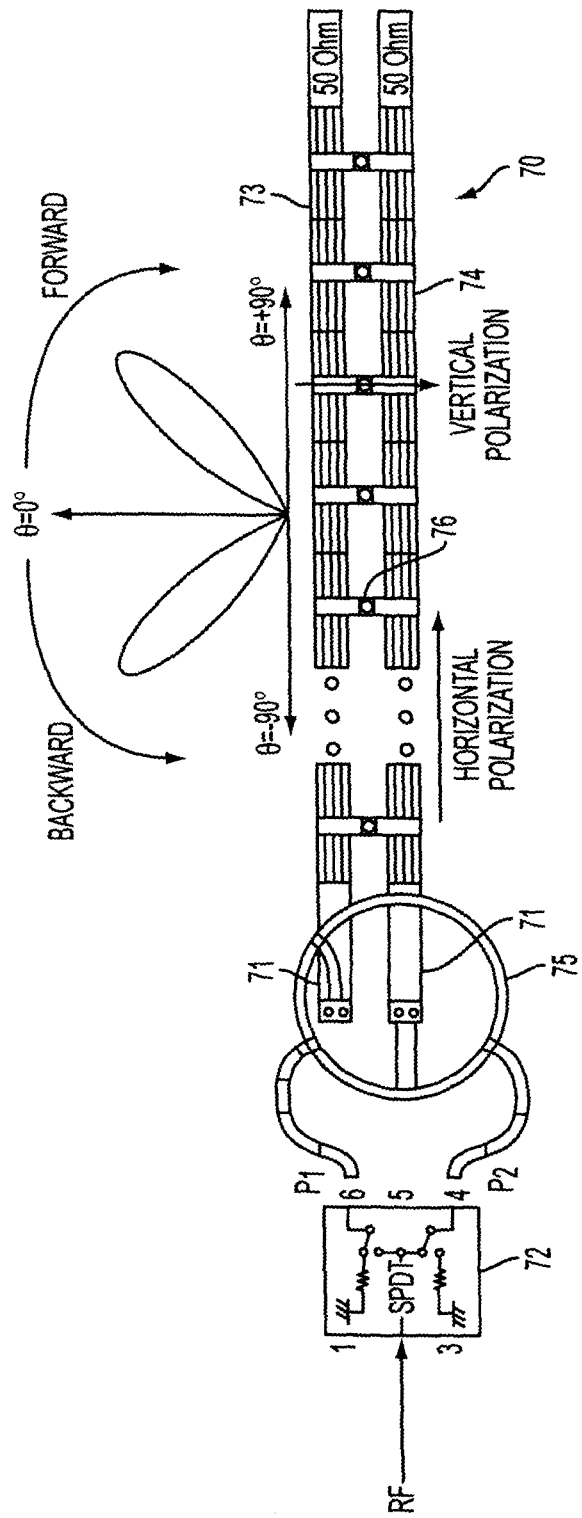
FIG. 16b shows another example of an antenna system fed at one of its ends, capable of generating a single full-space scanning beam ($-90° \le \theta \le +90°$) with switched polarizations using a single-pole double throw (SPDT) switch.

FIG. 16b shows another example of an antenna system fed at one of its ends, capable of generating a single full-space scanning beam (−90°≤θ≤+90°) with switched polarizations using a single-pole double throw (SPDT) switch. More specifically, FIG. 16b illustrates a variation 70 on the system of FIG. 16a with a feed at one end 71 using a SPDT switch 72. The antenna system 70 is capable of generating a single full-space scanning beam (−90°≤θ≤+90°) with switched polarizations. The system 70 is composed of dual-polarized CRLH LWAs 73 and 74 connected to a rat-race circuit 75 and a SPDT switch 72. If RF signal (RF) is routed to P1, then a single beam is generated with horizontal polarization. If the RF signal (RF) is routed to P2, then a single beam is generated with vertical polarization. The modulated data at RF radiates over a single beam with switched polarization. Those of ordinary skill in the art having the benefit of the present disclosure will be able to readily envision other variations on this implementation; the embodiment shown herein is for illustration purposes and should not be construed as limiting.

Figure 17A:
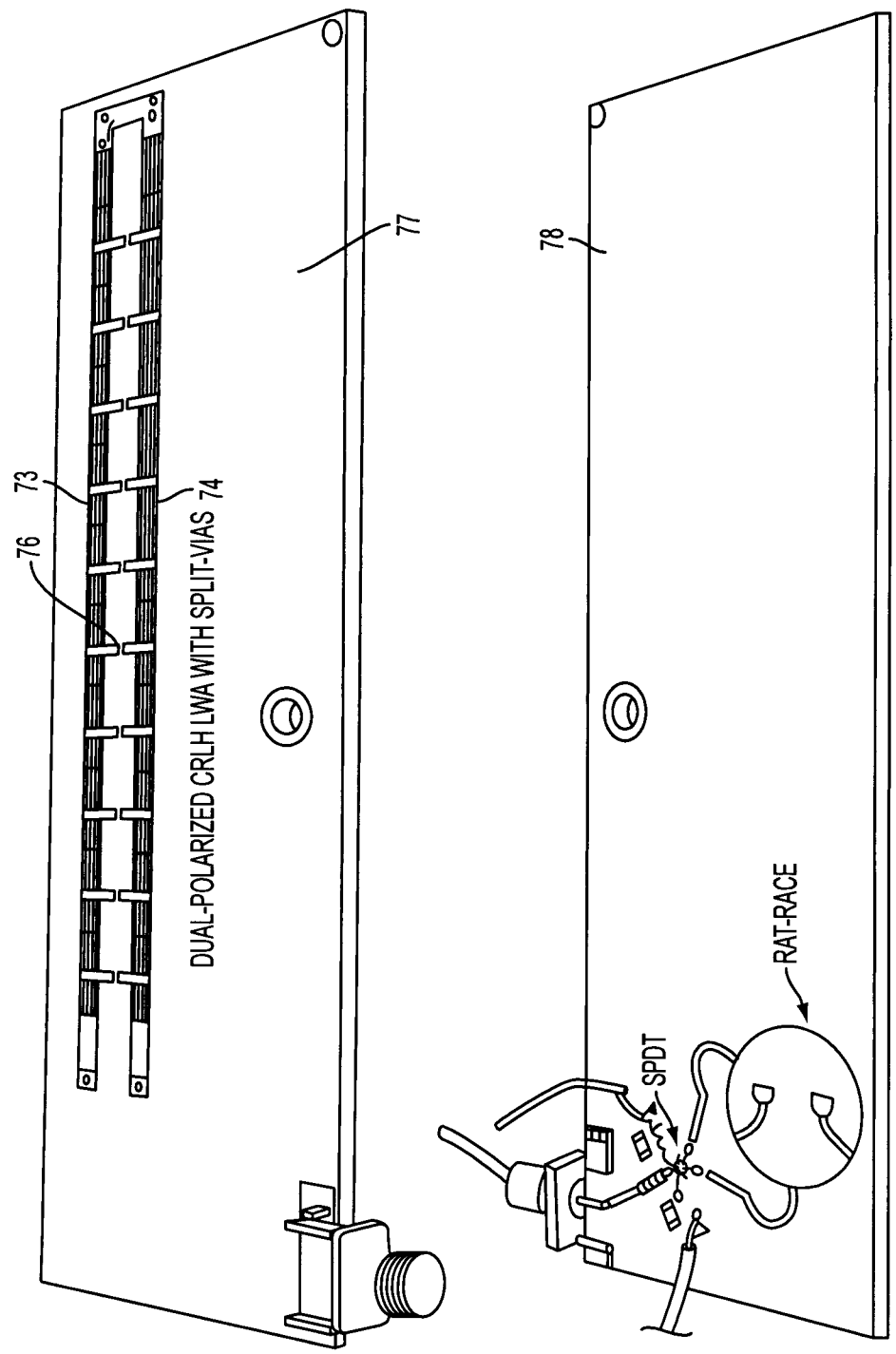
FIG. 17a shows a prototype of the antenna system of FIG. 16b, showing the dual-polarized CRLH LWA with split-vias on the top PCB and the rat-race and SPDT switch on the bottom PCB.
Figure 17B:
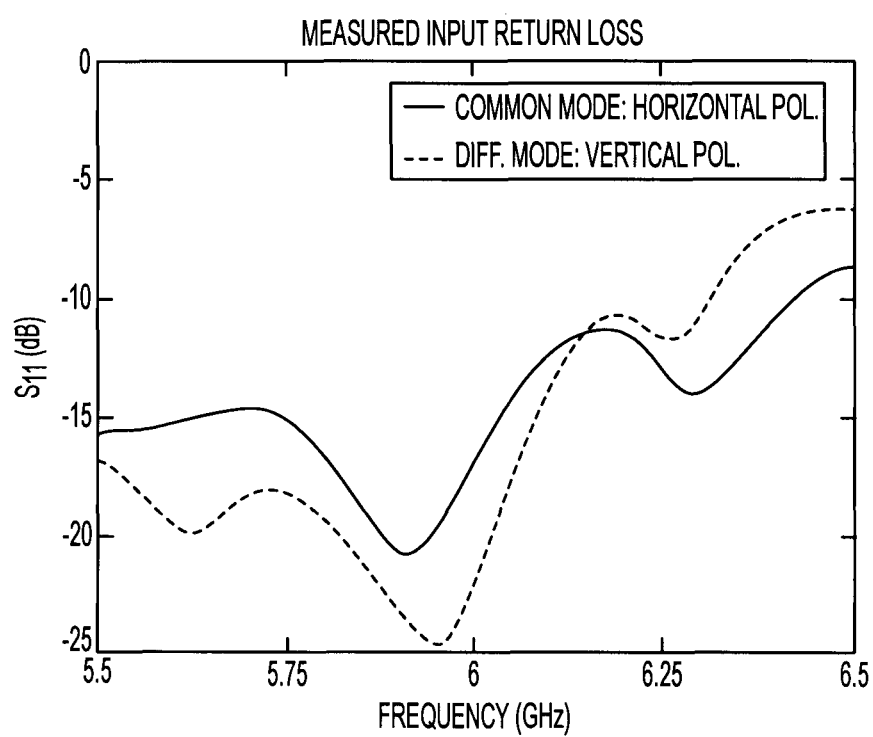
FIG. 17b shows the measured S-parameters for the prototype of FIG. 17a, showing similar common-mode and differential-mode reflection coefficients.

FIG. 17a shows a prototype of the antenna system of FIG. 16b, showing the dual-polarized CRLH LWA with split-vias on the top PCB and the rat-race and SPDT switch on the bottom PCB. In more details, FIG. 17a shows the prototype antenna system 70 illustrated in FIG. 16b, displaying the dual-polarized CRLH LWA 73 and 74 with split-via 76 implementation on the top printed circuit board (PCB) 77 and the rat-race 75 and SPDT switch 72 on the bottom PCB 78. FIG. 17b shows the measured S-parameters for the prototype of FIG. 17a, showing similar common-mode and differential-mode reflection coefficients. More specifically, FIG. 17b shows the measured S-parameters for the prototype antenna system of FIG. 17a, where both common-mode and differential-mode reflection coefficients are similar.

Figure 18:
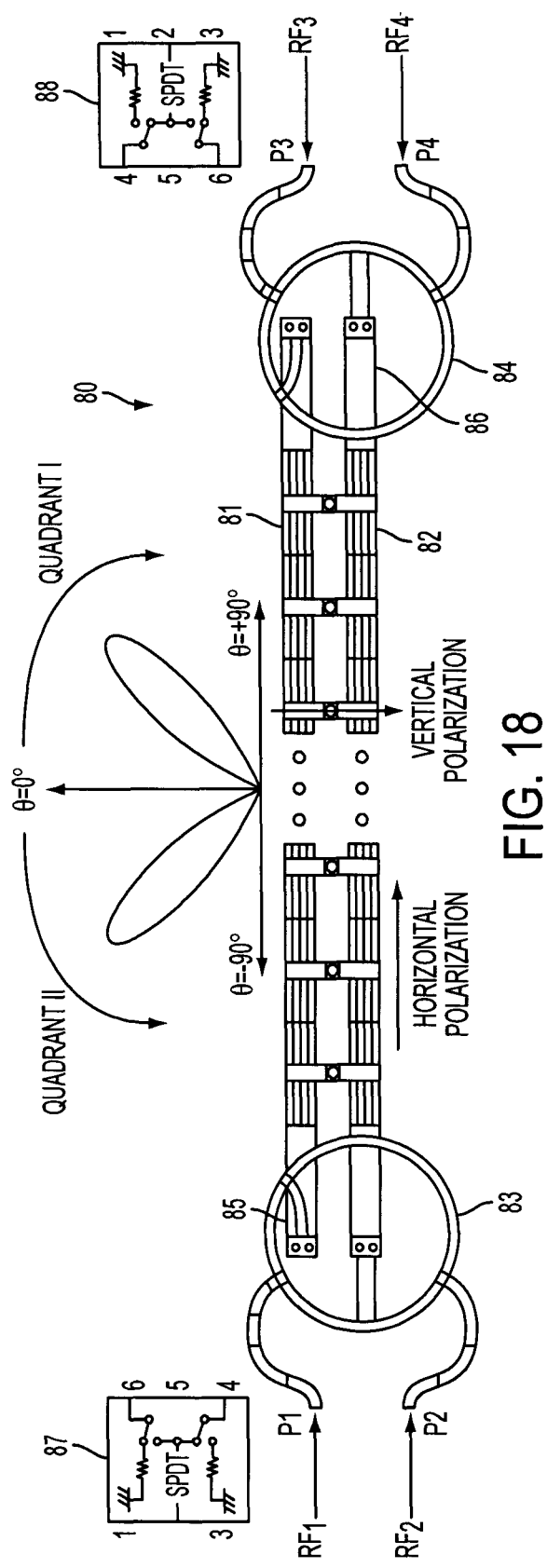
FIG. 18 shows a further example of an antenna system fed at both of its ends, capable of generating up to four full-space scanning beams ($-90° \ge \theta \le +90°$) with different polarizations.

FIG. 18 shows a further example of an antenna system fed at both of its ends, capable of generating up to four full-space scanning beams (−90°≤θ≤+90°) with different polarizations. As may be observed, FIG. 18 illustrates a second antenna system 80 fed at both of its ends. The antenna system 80 is capable of generating up to four full-space scanning beams (−90°≤θ≤+90°) with different polarizations.

The system 80 is composed of dual-polarized CRLH LWAs 81 and 82 connected to two rat-race circuits 83 and 84 at each end 85 and 86. Since each rat-race 83 and 84 has two inputs, the total number of inputs to this system is four, and hence there are 16 possible input combinations.

TABLE 1

Possible combinations of beam patterns generated by the antenna system of FIG. 18.

| Combination | $RF_{P1}$ | $RF_{P2}$ | $RF_{P3}$ | $RF_{P4}$ | # of beams | Polarization | Radiation Quadrant (fwd, bwd) |
|---|---|---|---|---|---|---|---|
| 1 | 1 | 0 | 0 | 0 | 1 | Horizontal | P1: (1, 2) |
| 2 | 1 | 1 | 0 | 0 | 2 | Horizontal + vertical | P1 + P2: (1, 2) |
| 3 | 1 | 0 | 1 | 0 | 2 | Horizontal | P1: (1, 2) P3: (2, 1) |
| 4 | 1 | 1 | 1 | 1 | 4 | Horizontal + vertical | P1 + P2: (1, 2) P3 + P4: (2, 1) |

Table 1 lists four (4) combination examples, out of 16 possible input combinations, for illustration purposes. For example, combination 1 is when an RF signal $RF_1$ is fed at P1, then a single beam is generated with horizontal polarization radiating in quadrant I (forward) and quadrant II (backward). Combination 2 is when RF signals $RF_1$ and $RF_2$ are simultaneously fed at P1 and P2, respectively, then dual beams are generated with dual polarizations (horizontal and vertical) both radiating in quadrant I (forward) and quadrant II (backward). Similarly, combination 4 is when RF signals $RF_1$, $RF_2$, $RF_3$, and $RF_4$ are simultaneously fed into P1, P2, P3, and P4, respectively, then four (4) beams are generated two of which have horizontal polarization ($RF_1$ and $RF_3$) while the other two have vertical polarizations ($RF_2$ and $RF_4$). The signals from P1 and P2 scan in quadrants I and II in the forward and backward modes, respectively, while the signals from P3 and P4 scan in quadrants II and I in the forward and backward modes, respectively. In a variant, SPDT switches could alternatively be used for dual-beam switched polarizations.

Similar to the antenna system of FIG. 16a, the modulated data at any of the port combination of Table 1 may be the same for diversity systems (SISO/SIMO/MISO), or may be different for multiplexing MIMO systems, or any combination.

As well, as in the case of FIG. 16b, two SPDT switches 87 and 88 may be added at both ends of the antenna system of FIG. 18, each connected to the rat-race circuits 83 and 84 (P1 and P2 connected to one SPDT switch 87; P3 and P4 connected to another SPDT switch 88). In this variation, dual beams may be generated from both ends with switched polarization each radiating a symmetrically opposite beam pattern which is scanned in full-space. Those of ordinary skill in the art having the benefit of the present disclosure will be able to readily envision other variations on this implementation; the embodiment shown herein is for illustration purposes and should not be construed as limiting.

Figure 19:
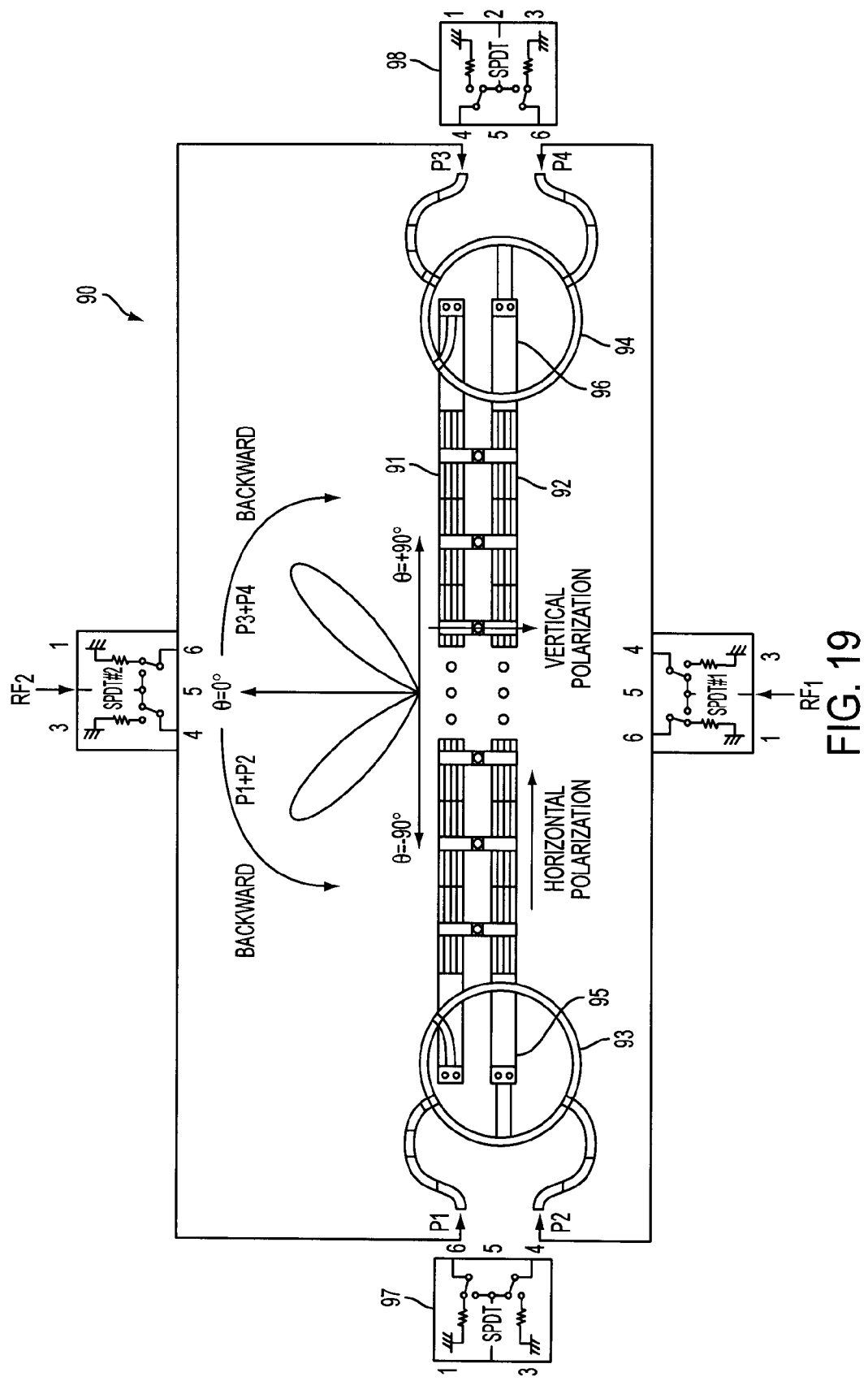
FIG. 19 shows yet another example of an antenna system fed at both of its ends based on an end-switched scheme, capable of generating two half-space scanning beams ($-90° \le \theta \le +90°$) with different polarizations.

An end-switching scheme between both ends, introduced in a publication by H. V. Nguyen, S. Abielmona, and C. Caloz, entitled "*End-Switched CRLH Leaky-Wave Antenna with Enhanced Electronic Full-Space Beam Steering Performance*", published in European Conference on Antennas and Propagation 2011, on 11-15 Apr. 2011, Rome, Italy, which is incorporated herein by reference, may be used in a third antenna system fed at both of its ends. FIG. 19 shows yet another example of an antenna system fed at both of its ends based on an end-switched scheme, capable of generating two half-space scanning beams (−90°≤θ≤+90°) with different polarizations. The antenna system 90 of FIG. 19 is capable of generating dual half-space scanning beams in the backward direction only (−90°≤θ≤0°) with different polarizations. The benefit of the half-space scanning aspect is the reduction of the varactor losses to improve radiation efficiency. The system is composed of dual-polarized CRLH LWAs 91 and 92 connected to two rat-race circuits 93 and 94 at either ends 95 and 96. The rat-race's common-mode ports (P1 and P3) are connected to an SPDT switch (SPDT#2) whose input is RF signal RF2, while the differential-mode ports (P2 and P4) are also connected to another SPDT switch (SPDT#1) whose input is RF signal RF1. The method of operation is as follows: If RF signal $RF_1$ is routed to P2, then a beam is generated in the backward direction with vertical polarization and may be scanned from −90°≤θ≤0°. If RF signal $RF_1$ is routed to P4, then a beam is generated in the backward direction also with vertical polarization and may be scanned from +90°≤θ≤0°. Similarly, the method is identical for RF signal $RF_2$ however with a beam having horizontal polarization.

The modulated data at $RF_1$ and $RF_2$ may be the same for diversity systems (SISO/SIMO/MISO), or may be different for multiplexing MIMO systems.

Two SPDT switches 97 and 98 may be added at both ends of the antenna system of FIG. 19, each connected to the rat-race circuits 93 and 94 (P1 and P2 connected to one SPDT switch 97; P3 and P4 connected to another SPDT switch 98). In this variation, dual beams may be generated from both ends with switched polarization each radiating a symmetrically opposite beam pattern which is scanned in half-space. Those of ordinary skill in the art having the benefit of the present disclosure will be able to readily envision other variations on this implementation; the embodiment shown herein is for illustration purposes and should not be construed as limiting. For example, The SPDT switches could alternatively be used for dual-beam switched polarizations.

Figure 20:
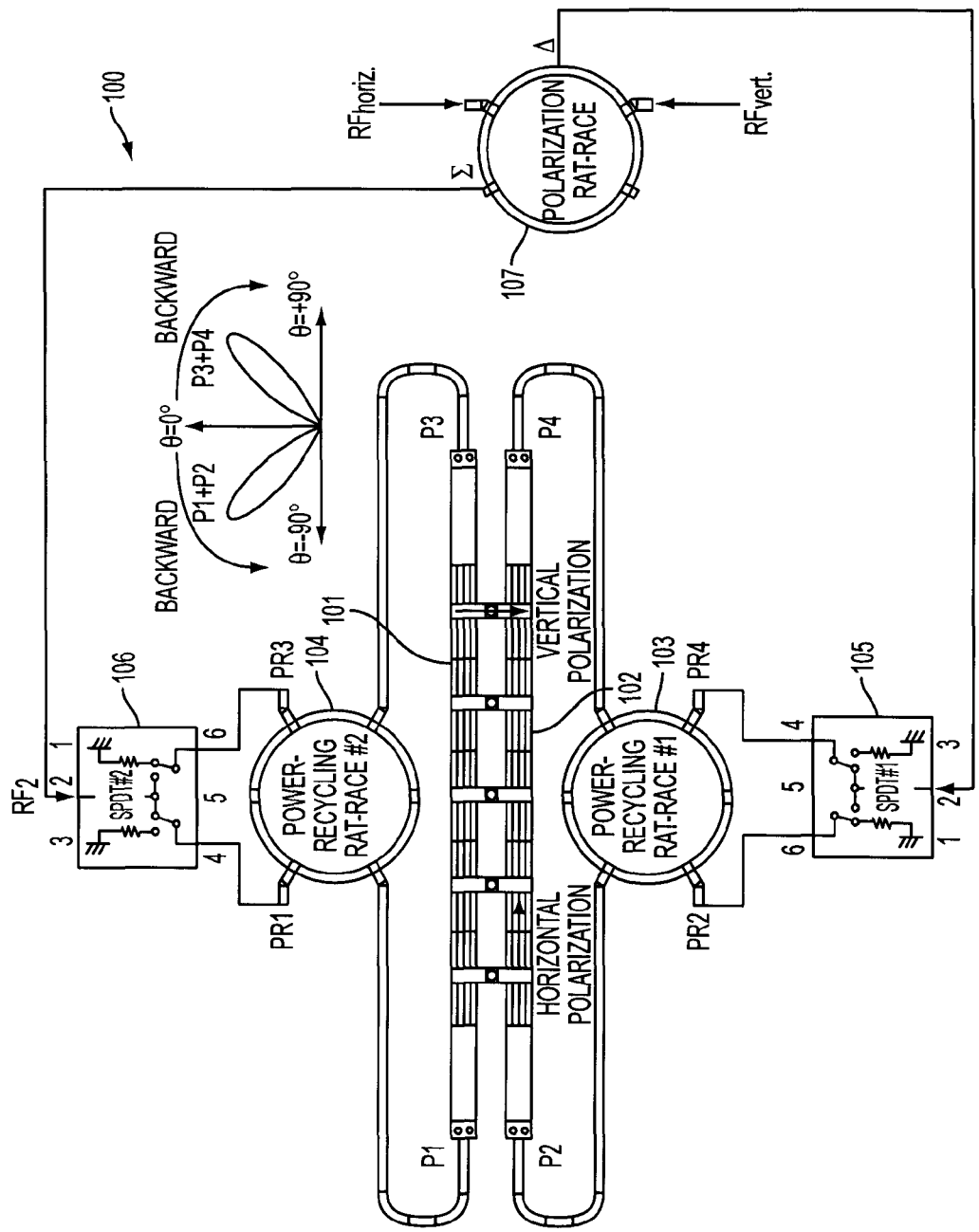
FIG. 20 shows a variant of an antenna system fed at both of its ends using an end-switched scheme with power-recycling, capable of generating two half-space scanning beams with different polarizations and high efficiency.

FIG. 20 shows a variant of an antenna system fed at both of its ends using an end-switched scheme with power-recycling, capable of generating two half-space scanning beams with different polarizations and high efficiency. As such, FIG. 20 illustrates a fourth antenna system 100 fed at both of its ends using an end-switched scheme along with a power-recycling scheme. The antenna system 100 is capable of generating single half-space scanning beams in the backward direction (−90°≤θ≤0°) with different polarizations. The benefit of the power-recycling aspect is the improvement of the CRLH LWA's radiation efficiency, while the benefit of the half-space scanning aspect is the reduction of the varactor losses to also improve efficiency. The system is composed of dual-polarized CRLH LWAs 101 and 102 connected at each end with a power-recycling rat-race 103 and 104 (as shown as "rat-race #1" and "rat race #2"). Each power-recycling rat-race 103 and 104 is connected to a corresponding SPDT switch 105 and 106 (also shown as "SPDT#1" and "SPDT#2"), whose inputs are the sum port (Δ) and the delta port (Σ) of the polarization rat-race 107. The inputs to the polarization rat-race 107 are two RF signals $RF_{horiz}$ and $RF_{vert}$ to induce horizontal and vertical polarization, respectively.

The method of operation is as follows: An RF signal fed at $RF_{horiz}$ is the CM signal for the polarization rat-race 107 splits into the sum and delta ports in-phase which are the inputs to SPDT#1 and SPDT#2, respectively. If SPDT#1 and #2 route the signal to PR3 and PR4, respectively, then P3 and P4 are the inputs to the dual-polarized CRLH LWA 101 and 102. Since the inputs are in-phase, the dual-polarized CRLH LWA 101 and 102 generate a beam in the backward direction with horizontal polarization and may be scanned from +90°≤θ≤0°. The remaining power at P1 and P2 is recycled back to power-recycling rat-races #2 and #1, respectively, where they will combine in-phase with the signal at PR3 and PR4, respectively. In this manner, no power is wasted and all the available power at the input is radiated, theoretically achieving 100% radiation efficiency.

The antenna system 100 may generate a beam in the backward direction with horizontal polarization which may be scanned from −90°≤θ≤0° by simply routing the signal to PR2 and PR1 from SPDT#1 and #2, respectively, with P3 and P4 providing the inputs to the power-recycling rat-races #2 and #1, respectively.

In a similar manner, a vertically-polarized beam may be generated by feeding the polarization rat-race 107 with an RF signal at $RF_{vert}$. Finally, a dual-polarized dual-beam (both horizontal and vertical) may be generated by feeding the polarization rat-race 107 with two RF signals at $RF_{horiz}$ and $RF_{vert}$ simultaneously. Those of ordinary skill in the art having the benefit of the present disclosure will be able to readily envision other variations on this implementation; the embodiment shown herein is for illustration purposes and should not be construed as limiting.

Figure 21:
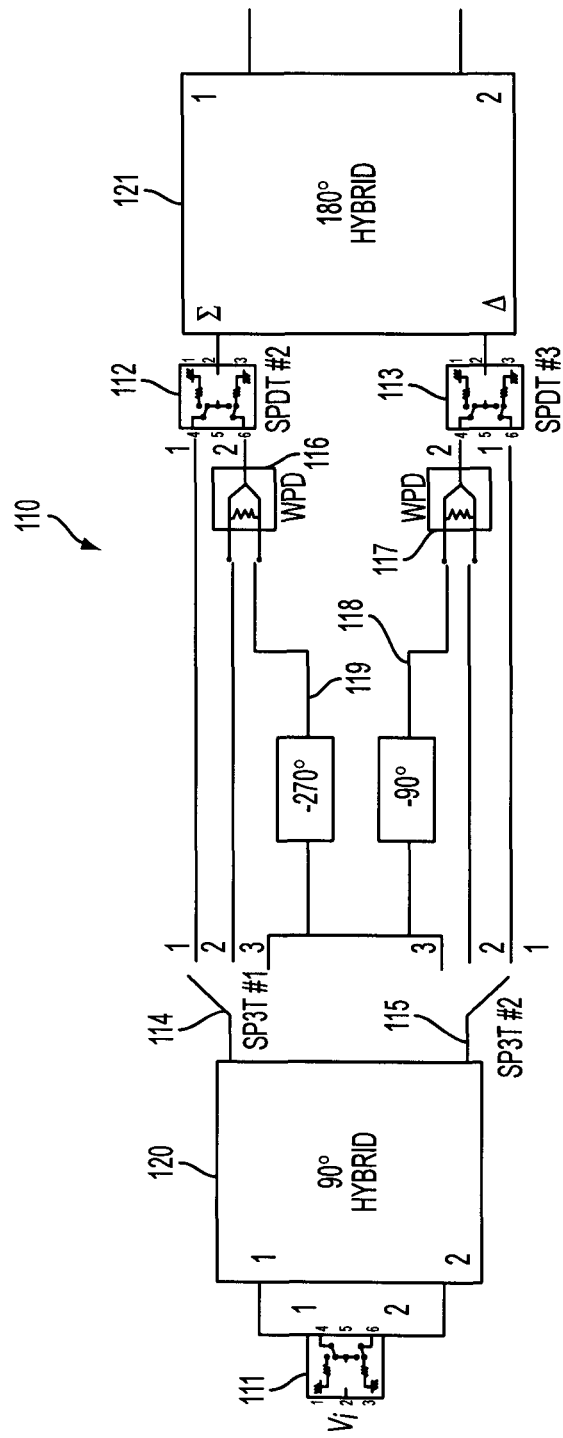
FIG. 21 shows another variant of an antenna system, capable of generating tri-polarizations (horizontal, vertical, and circular).

Finally, FIG. 21 shows another variant of an antenna system, capable of generating tri-polarizations (horizontal, vertical, and circular). In FIG. 21, the CRLH LWA is connected at ports 1 and 2 of the 180° hybrid. In details, FIG. 21 illustrates a polarizing system 110 for connection to a dual-polarized CRLH LWA unit. Together, the polarizing system 110 and the dual-polarized CRLH LWA are capable of generating beams with three different polarizations: horizontal, vertical, and circular. The polarizing system 110 comprises a switched matrix further comprising three SPDT switches 111, 112 and 113, two single-pole triple throw (SP3T) switches 114 and 115, two Wilkinson power dividers (WPD) 116 and 117, two transmission lines 118 and 119 with electrical lengths of −90° and −270°, and 90° and 180° hybrid power dividers 120 and 121. The dual-polarized CRLH LWA is connected to ports 1 and 2 of the 180° hybrid. The modes of operation are shown in Table 2.

TABLE 2

Modes of operation for the tri-polarized antenna system of FIG. 21.

| Polarization | SPDT#1 | SP3T#1 | SP3T#2 | SPDT#2 | SPDT#3 |
| --- | --- | --- | --- | --- | --- |
| Horizontal | 1 | 2 | 3 | 2 | 1 or 2 |
| Vertical | 1 | 3 | 2 | 1 or 2 | 2 |
| Clockwise Circular | 1 | 1 | 1 | 1 | 1 |
| Counter Clockwise Circular | 2 | 1 | 1 | 1 | 1 |

The CRLH LWA employed in the systems described above may be a frequency-scanning antenna. However, the systems presented above are also applicable to an electronically-scanned LWA having dependent or independent voltage controls, without loss of generality.

As disclosed, the polarization of the antenna system is specifiable between beams of different polarizations, for example, as per the modes of operation described in Table 2. A desired polarization of the beam may thereby be maintained upon rotation of the antenna system itself, by switching between the modes of operation. A gyroscopic sensing element with an integrated circuit (IC) interface capable of providing the measured angular rate of rotation around up to three orthogonal axes may be available to the antenna system disclosed. The gyroscope element may provide input to the antenna system so as to maintain the desired direction of the beam, and the desired polarization of the antenna system upon rotation around any one or more of the axes of rotation. In this manner, the antenna system may maintain a desirable direction and polarization with motion without continuous monitoring of the wireless channel in a communications environment. The gyroscopic sensing element may be combined with an acceleration sensing element with an IC interface in order to provide translation of location in a three dimensional space as well as rotation of the antenna system. In this manner the antenna system may maintain a desirable direction and polarization with motion without continuous monitoring of the wireless channel in a communications environment. It will be understood, that the antenna system may revert to monitoring of the wireless channel in a communications environment if the rotation or translation of its physical location is outside prescribed range bounds determined by the application.

The circuit implementations and systems described above provide the ability of polarization-diversity CRLH LWAs to improve the wireless channel in a communication environment and thus enhance the performance of SISO, SIMO, MISO, or MIMO systems by increasing either diversity gain, multiplexing gain, or both.

Those of ordinary skill in the art will realize that the description of the antenna units and antenna systems for providing polarization diversity are illustrative only and are not intended to be in any way limiting. Other embodiments will readily suggest themselves to such persons with ordinary skill in the art having the benefit of the present disclosure. Furthermore, the disclosed antenna units and antenna systems may be customized to offer valuable solutions to existing needs and problems of wireless signal polarization.

Although the present disclosure has been described hereinabove by way of non-restrictive, illustrative embodiments thereof, these embodiments may be modified at will within the scope of the appended claims without departing from the spirit and nature of the present disclosure.

REFERENCES

[1] L. Liu, C. Caloz, and T. Itoh, "Dominant mode (DM) leaky-wave antenna with backfire-to-endfire scanning capability," Electron. Lett., vol. 38, no. 23, pp. 1414-1416, November 2002.

[2] M. Hashemi and T. Itoh, "Evolution of composite right/left-handed leaky-wave antennas," Proc. of the IEEE, vol. 99, no. 10, pp. 1746-1754, October 2011.

[3] M. R. M. Hashemi and T. Itoh, "Dual-mode leaky-wave excitation in symmetric composite right/left-handed structure with center vias," Proc. IEEE MTT-S Int. Microwave Symposium, Anaheim, Calif., May 2010, pp. 9-12.

[4] H. V. Nguyen, S. Abielmona, and C. Caloz, "End-Switched CRLH Leaky-Wave Antenna with Enhanced Electronic Full-Space Beam Steering Performance" European Conference on Antennas and Propagation 2011, 11-15 Apr. 2011, Rome, Italy.

What is claimed is:

1. A leaky-wave antenna (LWA) system for providing polarization diversity, comprising:

a rat-race coupler having a summation port, a difference port and two output ports;
a pair of composite right/left-handed (CRLH) LWAs, each CRLH LWA being connected to a respective one of the output ports of the rat-race coupler; and
an inductive stub electrically connected between the pair of CRLH LWAs, the inductive stub being split between the pair of CRLH LWAs forming sections, each section of the split inductive stub having a separate grounded via.

2. The leaky-wave antenna system of claim 1, wherein:
injecting a signal in the summation port generates in-phase longitudinal currents along the pair of CRLH LWAs and out-of-phase transversal currents in the inductive stub; and
injecting a signal in the difference port generates out-of-phase longitudinal currents along the pair of CRLH LWAs and in-phase transversal currents in the inductive stub.

3. The leaky-wave antenna system of claim 1, wherein the inductive stub includes a plurality of inductive stubs connecting the pair of CRLH LWAs; and a plurality of inter-digital capacitors are implemented along each CRLH LWA between each pair of inductive stubs.

4. The leaky-wave antenna system of claim 1, comprising a capacitive component connected in series with each section of the split inductive stub and with the corresponding grounded via.

5. The leaky-wave antenna system of claim 1, wherein the pair of CRLH LWAs is a pair of dual-polarized CRLH LWAs.

6. The leaky-wave antenna system of claim 5, comprising a switch connected to the summation port and to the difference port of the rat-race coupler for routing an input radio-frequency (RF) signal to either one of the summation and difference ports.

7. The leaky-wave antenna system of claim 5, comprising:
another rat-race coupler connected to an opposite end of the pair of CRLH LWAs; and
a pair of switches connected to the summation ports and to the difference ports of respective rat-race couplers for routing input RF signals to either one of the summation and difference ports of the respective rat-race couplers.

8. The leaky-wave antenna system of claim 5, comprising:
another rat-race coupler connected to an opposite end of the pair of CRLH LWAs;
a first switch connected to the summation ports of the rat-race couplers for routing a first input RF signal to the summation port of a first one of the rat-race couplers; and
a second switch connected to the difference ports of the rat-race couplers for routing a second input RF signal to the first one or to a second one of the rat-race couplers.

9. The leaky-wave antenna system of claim 5, comprising:
another rat-race coupler connected to an opposite end of the pair of CRLH LWAs;
a first switch for receiving a first signal and for forwarding the first signal to a first end or to a second end of the pair of CRLH LWAs;
a second switch for receiving a second signal and for forwarding the second signal to the first end or to the second end of the pair of CRLH LWAs;
a third switch, connected to one of the rat-race couplers at the first end of the pair of CRLH LWAs, for receiving either or both of the first and second signals and for directing the received signal to either of the summation or difference port of the rat-race coupler at the first end of the pair of CRLH LWAs; and a fourth switch, connected to another one of the rat-race couplers at the second end of the pair of CRLH LWAs, for receiving either or both of the first and second signals and for directing the received signal to either of the summation or difference port of the rat-race coupler at the second end of the pair of CRLH LWAs.

10. The leaky-wave antenna system of claim 5, further comprising:

a polarizing unit, comprising:
   a 90-degree hybrid having two input ports for receiving a radio-frequency (RF) signal on one of the input ports, the 90-degree hybrid further having two output ports;
   a 180-degree hybrid having two output ports for connection to the pair of dual-polarized CRLH LWAs, the 180-hybrid further having a summation port and a difference port; and
   a switched matrix for directing the RF signal from one or both of the output ports of the 90-degree hybrid towards one or both of the summation and difference ports of the 180-degree hybrid.

11. The leaky-wave antenna system of claim 10, wherein:

the polarizing unit further comprises a switch for directing the RF signal on one of the input ports of the 90-degree hybrid; and the switched matrix comprises:
   a plurality of switches, including a switch connected to each of the output ports of the 90-degree hybrid and to each of the summation and difference ports of the 180-degree hybrid; and
   transmission lines between the switches connected to the output ports of the 90-degree hybrid and the switches connected to the summation and difference ports of the 180-degree hybrid, wherein:
      one of the transmission lines is connectable towards the difference port of the 180-degree hybrid via one of the switches has an electrical length of −90 degrees, and
      another one of the transmission lines is connectable towards the summation port of the 180-degree hybrid via another one of the switches has an electrical length of −270 degrees.

12. A leaky-wave antenna (LWA) system for providing polarization diversity, comprising:
   a pair of dual-polarized composite right/left-handed (CRLH) LWAs having an inductive stub implemented between the pair of CRLH LWAs for connecting the pair of CRLH LWAs to a grounded via;
   a first rat-race coupler having a summation port, a difference port and two output ports connected to opposite ends of a first one the pair of CRLH LWAs;
   a second rat-race coupler having a summation port, a difference port and two output ports connected to opposite ends of a second one of the pair of CRLH LWAs; and
   a third rat-race coupler having two input ports, a summation port operably connected to the first rat-race coupler and a difference port operably connected to the second rat-race coupler;
   wherein the first and second rat-race couplers are power recycling rat-race couplers, and the third rat-race coupler is a polarization rat-race coupler.

13. The leaky-wave antenna system of claim 12, wherein:
   a first input port of the two input ports of the third rat-race coupler is capable of receiving a first radio-frequency (RF) signal for horizontal polarization; and
   a second input port of the two input ports of the third rat-race coupler is capable of receiving a second RF signal for vertical polarization.

14. The leaky-wave antenna system of claim 12, comprising:
   a first switch for receiving a signal from the summation port of the third rat-race coupler and for directing the signal to one of the summation or difference ports of the first rat-race coupler; and
   a second switch for receiving a signal from the difference port of the third rat-race coupler and for directing the signal to one of the summation or difference ports of the second rat-race coupler.

* * * * *